United States Patent
Zhang et al.

(10) Patent No.: US 10,148,650 B2
(45) Date of Patent: Dec. 4, 2018

(54) METHOD, DEVICE AND SYSTEM FOR USER AUTHENTICATION

(71) Applicant: Tencent Technology (Shenzhen) Company Limited, Shenzhen (CN)

(72) Inventors: Jinming Zhang, Shenzhen (CN); Fanyuan Zeng, Shenzhen (CN); Maocai Li, Shenzhen (CN); Tanhong Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 110 days.

(21) Appl. No.: 14/991,757

(22) Filed: Jan. 8, 2016

(65) Prior Publication Data

US 2016/0127369 A1 May 5, 2016

Related U.S. Application Data

(63) Continuation of application No. PCT/CN2014/095177, filed on Dec. 26, 2014.

(30) Foreign Application Priority Data

Dec. 30, 2013 (CN) .......................... 2013 1 0747037

(51) Int. Cl.
*H04L 29/06* (2006.01)
*H04W 4/12* (2009.01)
(Continued)

(52) U.S. Cl.
CPC ...... *H04L 63/0876* (2013.01); *H04L 63/0853* (2013.01); *H04L 63/18* (2013.01);
(Continued)

(58) Field of Classification Search
CPC ............... H04L 63/083; H04L 63/0876; H04L 63/0853; H04L 63/0815; H04L 63/08;
(Continued)

(56) References Cited

U.S. PATENT DOCUMENTS

| | | | |
|---|---|---|---|
| 6,804,345 B1 * | 10/2004 | Bala ...................... | H04M 3/382 379/265.04 |
| 2004/0160304 A1 * | 8/2004 | Mosgrove ............... | B60R 25/23 340/5.21 |

(Continued)

FOREIGN PATENT DOCUMENTS

| | | |
|---|---|---|
| CN | 101079931 A | 11/2007 |
| CN | 101242404 A | 8/2008 |

(Continued)

OTHER PUBLICATIONS

Tencent Technology, ISRWO, PCT/CN2014/095177, Mar. 23, 2015, 8 pgs.

(Continued)

*Primary Examiner* — Catherine B Thiaw
*Assistant Examiner* — Sanchit K Sarker
(74) *Attorney, Agent, or Firm* — Morgan, Lewis & Bockius LLP

(57) ABSTRACT

A method of user authentication is disclosed. The method is performed at a server device having one or more processors and memory for storing programs to be executed by the one or more processors. The method includes receiving, from a first terminal device, a service request including identification information of the user. The method includes generating a verification code in response to the service request. The method also includes establishing, based on the identification information of the user, a voice communication with a second terminal device in response to a failure of sending a non-voice message including the verification code to the (Continued)

user in a non-voice communication method. The method further includes sending, during the voice communication and to the second terminal device, a voice message including the verification code such that the user uses the verification code to authenticate the service request at the first terminal device.

11 Claims, 19 Drawing Sheets

(51) Int. Cl.
    *H04W 4/16*     (2009.01)
    *H04W 4/14*     (2009.01)
    *H04W 4/18*     (2009.01)
    *H04W 12/06*     (2009.01)

(52) U.S. Cl.
    CPC ............... *H04W 4/12* (2013.01); *H04W 4/14* (2013.01); *H04W 4/16* (2013.01); *H04W 4/18* (2013.01); *H04W 12/06* (2013.01)

(58) Field of Classification Search
    CPC ....... H04L 63/102; H04L 29/06; G06F 21/31; H04W 4/12
    USPC .............................................................. 726/6
    See application file for complete search history.

(56) References Cited

U.S. PATENT DOCUMENTS

| | | | | |
|---|---|---|---|---|
| 2008/0010687 A1* | 1/2008 | Gonen | ................... | H04L 63/08 726/28 |
| 2008/0095331 A1* | 4/2008 | Wlasiuk | .............. | H04M 3/4938 379/88.14 |
| 2011/0047607 A1* | 2/2011 | Chen | ....................... | G06F 21/43 726/7 |
| 2011/0213711 A1* | 9/2011 | Skinner | ................... | G06F 21/43 705/71 |
| 2012/0002791 A1* | 1/2012 | Kraus | .................. | A61B 5/0022 379/37 |
| 2012/0182920 A1* | 7/2012 | Maeng | ................ | H04L 12/2832 370/312 |
| 2012/0253809 A1* | 10/2012 | Thomas | .................. | G10L 17/24 704/246 |
| 2013/0225128 A1* | 8/2013 | Gomar | .................. | H04W 12/06 455/411 |
| 2013/0347129 A1* | 12/2013 | Samuelsson | ............ | H04L 9/321 726/28 |
| 2015/0163182 A1* | 6/2015 | Chandrasekaran | ... | H04L 51/063 709/204 |
| 2016/0127369 A1* | 5/2016 | Zhang | ................. | H04L 63/0853 726/6 |
| 2016/0156784 A1* | 6/2016 | Gabrielli | ................ | H04M 7/003 370/352 |
| 2016/0277369 A1* | 9/2016 | Lee | ........................... | H04L 9/30 |
| 2016/0300242 A1* | 10/2016 | Truong | ................... | G10L 17/22 |
| 2016/0360403 A1* | 12/2016 | Jordi | ................... | H04L 63/0823 |

FOREIGN PATENT DOCUMENTS

| | | |
|---|---|---|
| CN | 101447872 A | 6/2009 |
| CN | 101729512 A | 6/2010 |
| CN | 101997849 A | 3/2011 |
| CN | 103326989 A | 9/2013 |
| CN | 103428161 A | 12/2013 |

OTHER PUBLICATIONS

Tencent Technology, IPRP, PCT/CN2014/095177, Jul. 5, 2016, 6 pgs.

* cited by examiner

1500

A verification server receives a verification code from a first terminal device associated with a user requesting a service — S151

The verification server compares the received verification code with a verification code included in a voice message sent from a voice-response server to a second terminal device associated with the user — S152

In accordance with a determination that the received verification code is identical to the verification code included in the voice message, the verification server authenticates the user for the service and sends a signal indicating the successful user authentication to a network-service server — S153

The network-service server provides the service to the first terminal device in response to receiving the signal — S154

S181 — A network service server receives, from a first terminal device associated with a user, a service request; the network service server sends, to a verification server, a verification request including identification information of the user S182 — The verification server sends a control instruction to the first terminal device such that the first terminal device presents a set of verification methods for the user to select S183 — The verification server receives, from the first terminal device, a signal indicating a non-voice verification method selected by the user from the set of verification methods, and then sends, to the user, a non-voice message including a verification code S184 — The non-voice message fails to reach the user S185 — The verification server sends, to a voice-response server, the verification code and the identification information of the user S186 — The voice-response server responds to a connection request received from a second terminal device associated with the user, and establishes a voice communication with the second terminal device, the connection request including identification information associated with the user S187 — The voice-response server determines whether the identification information of the user included in the verification request matches the identification information of the user included in the connection request S188 — In accordance with a determination that the two identification information of the user match, the voice-response server sends a voice message including the verification code to the second terminal device

FIG. 18

METHOD, DEVICE AND SYSTEM FOR USER AUTHENTICATION

PRIORITY CLAIM AND RELATED APPLICATION

This application is a continuation application of PCT Patent Application No. PCT/CN2014/095177, entitled "METHOD, DEVICE AND SYSTEM FOR USER AUTHENTICATION" filed on Dec. 26, 2014, which claims priority to Chinese Patent Application Serial No. 201310747037.6, entitled "METHOD, SYSTEM, AND SERVER FOR NETWORK SERVICE VERIFICATION," filed on Dec. 30, 2013, both of which are incorporated herein by reference in their entirety.

FIELD OF THE APPLICATION

The present application generally relates to the field of Internet technologies, and more particularly to a method, device and system for user authentication associated with network services.

BACKGROUND

With the rapid development of Internet technologies, various online services have been provided to users via the Internet, such as online transactions, online gaming, social networking, etc. Because of vulnerabilities in networks, security has become a critical issue for online services. Some known online service providers use verification codes to authenticate users. Typically, a user provides a cell phone number in requesting an online service at a terminal device. A user-authentication server sends a text message including a verification code to the user's cell phone. After receiving the verification code at the cell phone, the user then uses that verification code to complete a user authentication process at the terminal device, such that the online service can be provided to the user at the terminal device. Such a user authentication method, however, is not effective if the text message cannot be delivered to the user's cell phone in a timely manner (e.g., due to a network anomaly, a cell phone malfunction, a delay caused by a network congestion, etc.).

Therefore, a need exists for a method, device and system that can enable robust user authentication under various network conditions.

SUMMARY

The above deficiencies associated with the known user authentication method may be addressed by the techniques described herein.

In some embodiments, a method for user authentication with respect to providing an online service is disclosed. The method is performed at a server device having one or more processors and memory for storing programs to be executed by the one or more processors. The method includes receiving a service request from a first terminal device associated with the user. The service request includes identification information of the user. The method includes generating a verification code in response to the service request.

The method also includes establishing, based on the identification information of the user, a voice communication with a second terminal device associate with the user. In some instances, the first terminal device and the second terminal device are the same terminal device. In other instances, the first terminal device is different from the second terminal device. In some instances, for example, the server device makes a phone call to a phone of the user to establish the voice communication. In some other instances, for example, the server device receives and responds to a phone call from a phone of the user.

The voice communication is established in response to a failure of the server device sending a non-voice message to the user in a non-voice communication method, where the non-voice message includes the verification code. In some instances, the server device fails to send the non-voice message to the second terminal device of the user. In some instances, the server device establishes the voice communication with the second terminal device within a predefined period of time from receiving the service request.

The method further includes sending, during the voice communication and to the second terminal device, a voice message including the verification code. As a result, the user uses the verification code to authenticate the service request at the first terminal device.

In some instances, the method includes, after receiving the service request and before establishing the voice communication, sending a control instruction to the first terminal device such that the first terminal device presents a set of verification methods for the user to select. The method further includes receiving, from the first terminal device, a signal indicating a verification method selected by the user from the set of verification methods. In some instances, the set of verification methods includes at least a voice verification method. In some instances, the set of verification methods includes at least a non-voice verification method.

In some instances, the method includes, after sending the voice message, receiving a verification code from the first terminal device. The method also includes comparing the received verification code with the verification code sent to the second terminal device. The method further includes authenticating the service request at the first terminal device in accordance with a determination that the received verification code is identical to the verification code sent to the second terminal device.

In some embodiments, a server device includes one or more processors and memory storing one or more programs for execution by the one or more processors. The one or more programs include instructions that cause the server device to perform the method of user authentication as described above. In some embodiments, a non-transitory computer readable storage medium stores one or more programs including instructions for execution by one or more processors. The instructions, when executed by the one or more processors, cause the processors to perform, at a server device, the method of user authentication as described above.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the application when taken in conjunction with the drawings.

FIG. 15 is a flow chart illustrating another method performed at a system associated with user authentication in accordance with some embodiments.

FIG. 18 is a flow chart illustrating another method performed at a system associated with user authentication in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
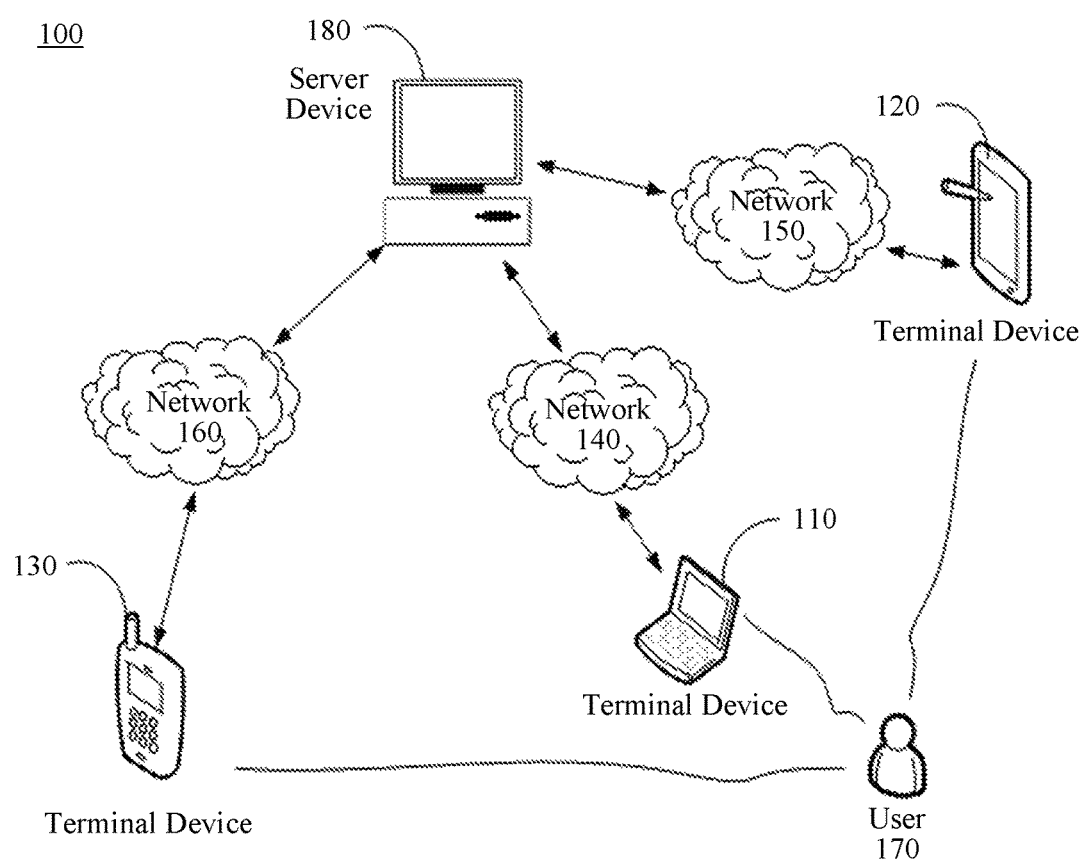
FIG. 1 is a schematic diagram illustrating a system configured to authenticate users for online services in accordance with some embodiments.

FIG. 1 is a schematic diagram illustrating a system 100 configured to authenticate users for online services in accordance with some embodiments. As shown in FIG. 1, the system 100 includes terminal devices 110, 120 and 130 operated by a user 170, and a server device 180. The server device 180 is operatively coupled to the terminal devices 110, 120, 130 via networks 140, 150, 160. In some embodiments, although not shown in FIG. 1, a system configured for user authentication can include more than one server device operatively coupled to more or less terminal devices than those shown in FIG. 1.

An online service (or service) described herein can be any program, application, service, function, process, etc. that can be executed collectively at a server device (e.g., the server device 180) and a terminal device (e.g., the terminal device 110, 120, 130). Specifically, the terminal device is operatively coupled to and communicates with the server device (e.g., via one or more networks such as the Internet). A user operates the terminal device to access the online service via, for example, a user interface (e.g., a webpage) of the online service that is displayed at the terminal device. The user then goes through a user authentication process to verify that she is an authorized user permitted to use the online service. After the user is successfully authenticated, the user can operate the terminal device to use the online service. In some embodiments, such an online service can be, for example, online transactions, online gaming, social networking, and/or the like.

The server device 180 can be any type of device that is configured to function as a server-side device to authenticate user(s) with respect to providing online service(s) to the user(s). Specifically, as described below with respect to FIGS. 2-22, when a user operating a terminal device (e.g., the user 170 operating the terminal device 110, 120 or 130) attempts to access and/or use an online service using that terminal device, the server device 180 is configured to authenticate the identity of the user. In some embodiments, the server device 180 is configured to determine whether a person operating the terminal device is an authorized user of the online service or not. As a result of the user being authenticated by the server device 180 (or equivalently, it is verified that the person operating the terminal device is an authorized user of the online service), the user is permitted to access and/or use the online service using the terminal device.

In some embodiments, the server device 180 is configured to communicate with multiple terminal devices (e.g., the terminal devices 110, 120, 130) via one or more networks (e.g., the networks 140, 150, 160). Such a server device can be, for example, a background server, a back end server, a database server, a workstation, a desktop computer, a cloud computing server, a data processing server, and/or the like. In some embodiments, a server device can be a server cluster or server center consisting of two or more servers (e.g., a data processing server and a database server). For example, as shown and described below with respect to FIGS. 13 and 20, a server device can be a server cluster including at least a verification server, a voice-response server and a network-service server. Details of a server device are shown and described below with respect to FIGS. 9-13 and 20-21.

A terminal device described herein (e.g., the terminal devices 110, 120, 130) can be any type of electronic device configured to function as a client-side device to authenticate user(s) with respect to providing online service(s) to the user(s). In some embodiments, such a terminal device can be, for example, a cellular phone, a smart phone, a mobile Internet device (MID), a personal digital assistant (PDA), a palmtop computer, a tablet computer, an e-reader, a laptop computer, a handheld computer, a smart TV, a touchpad, a wearable device, a desktop computer, a vehicle terminal, and/or the like. In some embodiments, a terminal device can be any electronic device on which a client-side portion of an online service software application can be installed and executed. In some embodiments, such a terminal device can be referred to as, for example, a client device, a user device, a mobile device, a portable device, a terminal, and/or the like. In some embodiments, one or more software applications related to the online service(s), user authentication and/or other related services are installed and executed at such a terminal device.

In some embodiments, a terminal device (e.g., the terminal device 110 or 120) can be used by a user (e.g., the user 170) to access and/or use an online service. In such embodiments, the user is authenticated by an associated server device (e.g., the server device 180) with respect to operating that terminal device to access and/or use the online service. In other words, the server device verifies that the person operating that terminal device is an authorized user of the online service. Thus, the user is allowed to use that terminal device to access and/or use the online service. In such embodiments, such a terminal device can be referred to as, for example, an operational terminal device.

In some other embodiments, a terminal device (e.g., the terminal device 130) can be used by a user (e.g., the user 170) to receive information (e.g., verification code) associated with authenticating the user with respect to using another terminal device (an operational terminal device, e.g., the terminal device 110 or 120) to access and/or use an online service. That is, the terminal device (which receives information) is used as a communication tool to enable user authentication with respect to operating the other terminal device (that is, the operational terminal device) to access and/or use the online service. In such embodiments, such a terminal device can be referred to as, for example, a communicational terminal device.

A user operates an operational terminal device to access an online service. In some embodiments, for example, a client-side portion of the online service can be installed and executed at the operational terminal device, or a user interface (e.g., a webpage) of the online service can be retrieved and presented to the user by the operational terminal device. Additionally, in some embodiments, such an operational terminal device is not necessarily configured to enable a certain type of communication and/or receive a certain type of messages used to convey information associated with user authentication. For example, a laptop can be an operational terminal device configured to access a webpage of an online service (e.g., online transactions), but not configured to receive a phone call that potentially conveys a verification code. As shown in FIG. 1, the terminal device 110 (e.g., a laptop) or the terminal device 120 (e.g., a touchpad) can be such an operational terminal device.

A user operates a communicational terminal device to receive information associated with user authentication in one or more certain communication methods. In some embodiments, for example, the communicational terminal device is configured to establish a certain type of communication channel with a server device, such that the communicational terminal device can receive, from the server device and via the communication channel, a certain type of messages including information associated with user authentication. Particularly, in some embodiments, a communicational terminal device is configured to receive, via a voice communication channel, voice messages including information associated with user authentication. Additionally, in some embodiments, such a communicational terminal device is not necessarily configured to enable access to an associated online service. For example, a cellular phone can be a communicational terminal device configured to receive a phone call that potentially conveys a verification code, but not configured to access a webpage of an online service (e.g., social networking). As shown in FIG. 1, the terminal device 130 (e.g., a cellular phone) can be such a communicational terminal device.

In some embodiments, a terminal device can be configured to function as both an operational terminal device and a communicational terminal device. In such embodiments, a user can operate the terminal device to access an online service, and at the meantime, to use the same terminal device to receive information associated with user authentication. Thus, a need for two or more terminal devices is eliminated. For example, a smart phone can be a terminal device configured both to access an online service (e.g., retrieve and display a webpage of the online service) and to receive information associated with user authentication in a certain communication method (e.g., receive phone calls).

A network (e.g., the networks 140, 150, 160) connecting a server device (e.g., the server device 180) with a terminal device (e.g., the terminal device 110, 120 or 130) can be any type of network configured to operatively couple one or more server devices to one or more terminal devices, and enable communications between the server device(s) and the terminal device(s). In some embodiments, such a network can include one or more networks such as, for example, a cellular network, a satellite network, a local area network (LAN), a wide area network (WAN), a wireless local area network (WLAN), a peer-to-peer (P2P) network, a professional service provider (PSP) network, the Internet, etc. In some embodiments, such a network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, 2.5G/3G/4G technologies, near field communication (NFC) technologies, etc.

In some embodiments, a network (e.g., the networks 140, 150) connecting a server device (e.g., the server device 180) and an operational terminal device (e.g., the terminal devices 110, 120) can be, for example, a data network (e.g., the Internet) that enables data communication between the server device and the operational terminal device. Thus, the operational terminal device can access an online service by receiving data from and sending data to the server device via a data communication channel. In some embodiments, a network (e.g., the network 160) connecting a server device (e.g., the server device 180) and a communicational terminal device (e.g., the terminal device 130) can be, for example, a network (e.g., a cellular network, a voice over IP network) that enables voice communication between the server device and the communicational terminal device. Thus, the communicational terminal device can receive voice messages associated with user authentication from the server device via a voice communication channel.

A user (e.g., the user 170) operating a terminal device (e.g., the terminal devices 110, 120, 130) can be any person interested in access and/or use the online service(s) provided by the terminal device, an associated server device (e.g., the server device 180), and/or other devices included in the system 100. Such a user typically is an owner or operator of one or more terminal devices (e.g., the terminal devices 110, 120, 130). In some embodiments, a user can use different terminal devices (e.g., a smart phone, a laptop, and a desktop computer) to access the same online service or different online services and to perform user authentication for that user. In some embodiments, different users (e.g., members of a family) can use the same terminal device to access online service(s) and to perform user authentications for the different users.

Figure 2:
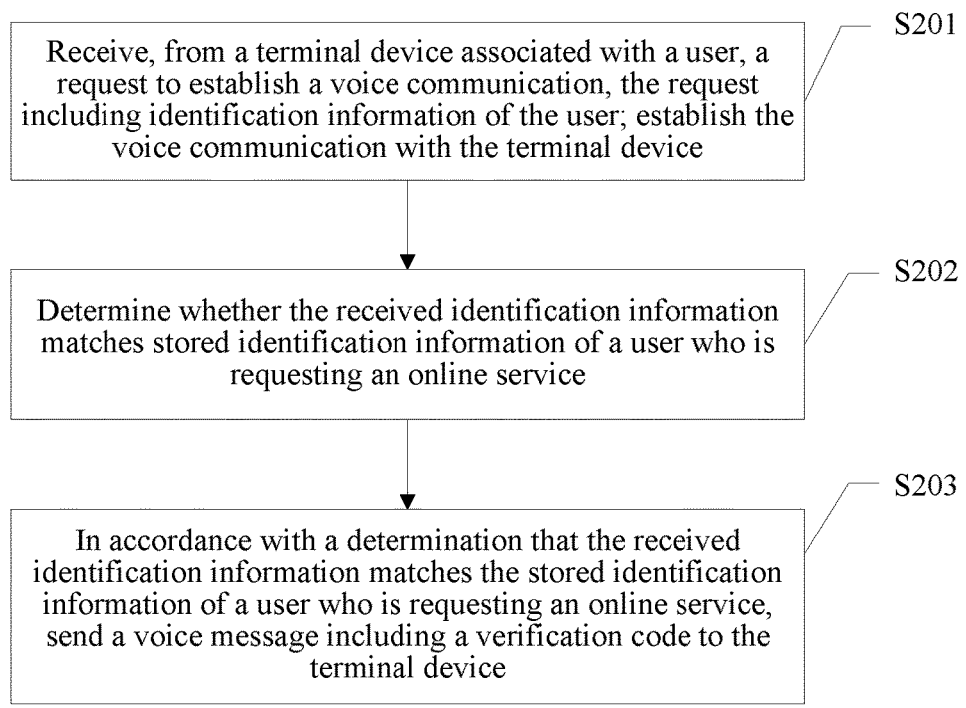
FIG. 2 is a flow chart illustrating a method performed at a server device associated with user authentication in accordance with some embodiments.

FIG. 2 is a flow chart illustrating a method 200 performed at a server device associated with user authentication in accordance with some embodiments. The server device performing the method 200 can be similar to the server device 180 shown and described above with respect to FIG. 1. Particularly, the server device performing the method 200 is operatively coupled to at least one terminal device associated with (e.g., owned by, operated by, registered under the name of, etc.) a user. The server device and the terminal device(s) are configured to collectively provide an online service to the user, and to perform user authentication for the user as described below.

In some embodiments, the server device performing the method 200 can include one or more processors and memory. In such embodiments, the method 200 is governed by instructions or code of an application that are stored in a non-transitory computer readable storage medium of the server device and executed by the one or more processors of the server device. The application is associated with authenticating users with respect to accessing and using the online service. In some embodiments, such an application can have a server-side portion that is stored in and/or executed at the server device, and a client-side portion that is stored in and/or executed at the terminal device(s) operatively coupled to the server device and operated by the user. As a result of the application (or the server-side portion of the application) being executed, the method 200 is performed at the server device. As shown in FIG. 2, the method 200 includes the following steps.

At S201, the server device receives, from a terminal device associated with the user, a request to establish a voice communication. The request includes identification information of the user. In response to the request, the server device establishes the voice communication with the terminal device. The request can be in any suitable form associated with any type of voice communication that is initiated by the terminal device. In some embodiments, the voice communication can be, for example, a phone call, a video/audio conference, voicemails, voice messaging, online chatting (with audio capability), instant messaging (with audio capability), transferring of files (e.g., audio clips), and/or the like. In such embodiments, the request can be, respectively, an incoming call, a request for video/audio conference, a received voicemail, a received voice message, a received message from online chatting, a received instant message, a request to retrieve a file, and/or the like.

The identification information of the user can be any type of information associated with the user and/or a terminal device associated with (e.g., owned by, operated by, registered under the name of, etc.) the user. Such identification information is typically used to uniquely identify the user or the terminal device associated with the user. For example, the identification information can be a user ID of the user, an account number of the user, an email address of the user, contact information (e.g., a phone number) of the user, and/or the like. Particularly, in some embodiments, the identification information can include an identification number (e.g., a mobile phone number, a land phone number, etc.) associated with a communicational terminal device associated with the user. Such an identification number can be uniquely linked to the communicational terminal device.

In some embodiments, the server device establishes the voice communication with the terminal device by responding to the request accordingly. For example, the server device can answer (automatically or manually) an incoming phone call from the terminal device; accept a request for video/audio conference; send a responding message (e.g., including a voice message) via online chatting; send a responding instant message (e.g., including a voice message); transferring a file (e.g., an audio clip), and/or the like.

In some embodiments, the request for voice communication is associated with user authentication when the user attempts to access and/or use the online service to, for example, log in a user interface (e.g., a webpage) of the online service, to make an online transaction, to download data from the server device, and/or the like. In some embodiments, the user needs to perform the user authentication process when the user logs in the online service, and does not need to perform subsequent user authentication after login. In some other embodiments, the user needs to perform the user authentication process for each certain operation within the online service (e.g., a transaction) even after login.

In some embodiments, to send the request for voice communication from the terminal device to the server device, the user has previously obtained contact information of the server device such as, for example, a phone number connecting to the server device, an instant messaging ID of the server device, an online chatting ID of the server device, and/or the like. In some embodiments, the contact information of the server device can be displayed on a user interface (e.g., a webpage) associated with the online service, thus accessible to the user. In other embodiments, the contact information of the server device can be made available and/or accessible to the user in any other suitable method.

At S202, the server device determines whether the received identification information matches stored identification information of a user who is requesting an online service. In some embodiments, the server device is configured to handle multiple requests for the online service from different users at the same time (or substantially the same time). Each user is a registered user with the online service. Thus, the server device is configured to store, or to retrieve from another device, identification information of each registered user. In some embodiments, as described above, the identification information of each registered user stored at or accessible to the server device can include identification information (e.g., a phone number) of a terminal device associated with that registered user. In response to the request for voice communication, the server device is configured to compare the received identification information of the user making the request for voice communication with the stored or retrieved identification information of each register user who is currently making a service request for the online service. In some embodiments, such a comparison can be performed in any suitable way at the server device.

In some embodiments, in requesting the online service, the user can enter the identification information (e.g., a phone number, a user ID, an email address) into a user interface (e.g., a webpage) of the online service. In some embodiments, once the user enters the identification information (e.g., at login), the user is not requested to enter the identification information again for subsequent user authentication. In such embodiments, the entered identification information can be linked to an account of the user. For example, the identification information of the user is stored at the server device when the user is logged in the online service, and retrieved every time when the user authentication process is performed. In some other embodiments, the user is requested to enter identification information for each user authentication.

At S203, the server device sends a voice message including a verification code to the terminal device in accordance with a determination that the received identification information matches the stored identification information of a user who is requesting the online service. In accordance with the determination of such a match, the server device determines that the user who has a pending service request for the online service is the one who is making the request for voice communication. In response, the server device sends the voice message including the verification code to the terminal device. The verification code is generated by the server device in response to the service request of the user for the online service. Thus, the user can use the verification code for user authentication at the terminal device.

In some embodiments, the server device sends the voice message to the terminal device during the voice communication between the server device and the terminal device. The voice message can be a synthetic voice message automatically generated by the server device or another device (e.g., an interactive voice response (IVR)). Alternatively, the voice message can be manually generated by, for example, an agent, an operator or a representative associated with the online service or the server device. For example, an agent of the online service can speak the verification code to the user during a phone call.

In some embodiments, after receiving the voice message, the user can operate the terminal device to replay the voice message, thus listening to the voice message repeatedly. For example, the user can select a replay option by pressing the "*" button or the "#" button on the terminal device (e.g., a phone). In some embodiments, the voice message cannot be replayed once the voice communication is disconnected.

In some embodiments, in accordance with a determination that the received identification information does not match the stored identification information of any user who is requesting the online service, the server device refrains from sending the verification code to the terminal device. In other words, the server device does not authenticate the user with respect to accessing the online service. In such embodiments, the server device can send a message (e.g., a voice message, a non-voice message such as a text message) to the terminal device, informing to the user the failure of user authentication. The server device can also terminate the voice communication.

Figure 3:
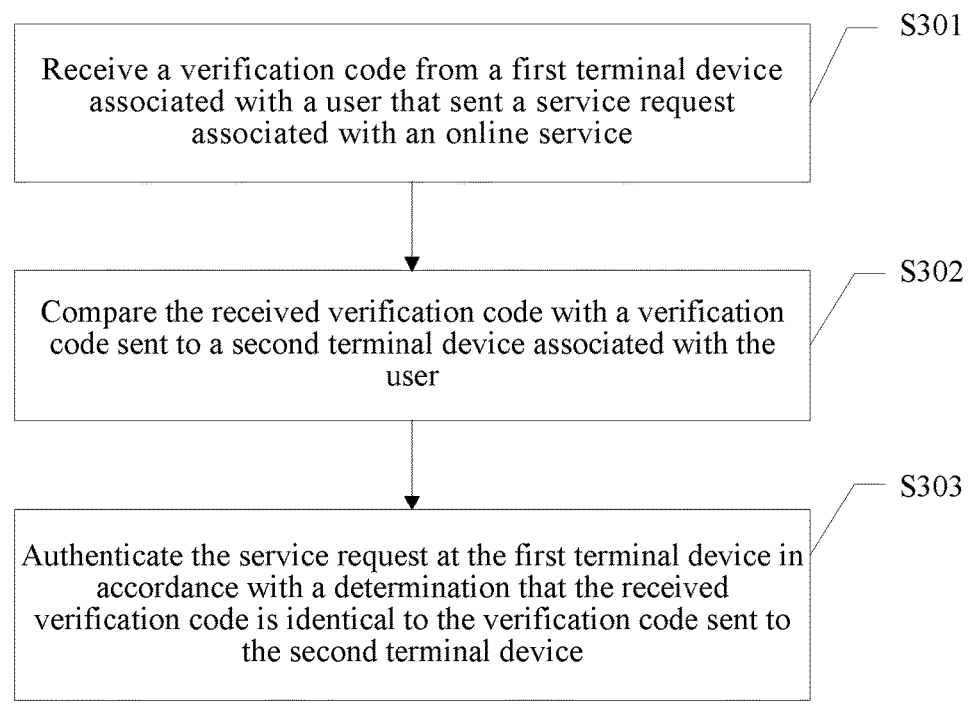
FIG. 3 is a flow chart illustrating another method performed at a server device associated with user authentication in accordance with some embodiments.

FIG. 3 is a flow chart illustrating a method 300 performed at a server device associated with user authentication in accordance with some embodiments. The server device performing the method 300 can be similar to the server devices shown and/or described above with respect to FIGS. 1-2. Particularly, the server device performing the method 300 is operatively coupled to at least one terminal device associated with (e.g., owned by, operated by, registered under the name of, etc.) a user. The server device and the terminal device(s) are configured to collectively provide an online service to the user, and to perform user authentication for the user as described below. In some embodiments, the server device is configured to perform the method 300 after performing the method 200 in FIG. 2. In such embodiments, the method 300 describes a process subsequent to the process of the method 200 as described above with respect to FIG. 2.

In some embodiments, the server device performing the method 300 can include one or more processors and memory. In such embodiments, the method 300 is governed by instructions or code of an application that are stored in a non-transitory computer readable storage medium of the server device and executed by the one or more processors of the server device. The application is associated with authenticating users with respect to accessing and using the online service. In some embodiments, such an application can have a server-side portion that is stored in and/or executed at the server device, and a client-side portion that is stored in and/or executed at the terminal device(s) operatively coupled to the server device and operated by the user. As a result of the application (or the server-side portion of the application) being executed, the method 300 is performed at the server device. As shown in FIG. 3, the method 300 includes the following steps.

At S301, the server device receives a verification code from a first terminal device associated with the user that sent a service request associated with the online service. The operations of S301 are performed subsequent to the operations of S201-S203 of the method 200 in FIG. 2. That is, the server device sent the verification code to the user in response to the service request previously sent from the first terminal device to the server device. The user then enters the verification code at the first terminal device in the user authentication process. As a result, the first terminal device sends the verification code to the server device.

The user can operate the first terminal device to send the service request to the server device. The server device can generate the verification code in response to the service request. The verification code generated for each service request can be uniquely associated with that service request (thus uniquely associated with the user and the terminal device that sent the service request), such that the verification code can be only used to authenticate the user with respect to using the terminal device to access the online service. For example, a first user sends to the server device a first service request with respect to accessing the online service; and a second user sends to the server device a second service request with respect to accessing the online service. In response to the first service request and the second service request, the server device generates a first verification code and a second verification code, respectively. The server device then sends the first verification code to the first user, and sends the second verification code to the second user, respectively. As a result, the first user can use the first verification code to complete user authentication, and the second user can use the second verification code to complete user authentication. However, the first user cannot use the second verification code to complete user authentication, and the second user can use the first verification code to complete user authentication.

At S302, the server device compares the received verification code with a verification code sent to a second terminal device associated with the user. As described above, the server device sends to the user a verification code generated in response to the service request received from the first terminal device. The server device can send the verification code to the second terminal device associated with (e.g., owned by, operated by, registered under the name of, etc.) the user based on, for example, identification information of the second terminal device provided by the user, or identification information of the second terminal device associated with the user and stored at the server device.

For example, in making the service request, the user is asked to provide identification information of a terminal device associated with the user that can be used to receive the verification code. The user enters a phone number linked to the second terminal device. Thus, a call is made from the server device to the second terminal device, and the verification code is included in a voice message sent from the server device to the second terminal device during the phone call.

For another example, in making the service request, the user is asked to provide personal identification information such as a user ID. The server device then retrieves identification information (e.g., a phone number) of the second terminal device based on the personal identification information of the user, where the identification information of the second terminal device is stored with and linked to the personal identification information of the user in, for example, a database accessible to the server device. Subsequently, the server device follows the same procedure described above to send the verification code to the second terminal device.

In some embodiments, as described above, the first terminal device is an operational terminal device associated with the user, and the second terminal device is a communicational terminal device associated with the user. In some embodiments, the first terminal device and the second terminal device are two distinctive terminal devices associated with the user. In such embodiments, the first terminal device functions as an operational terminal device and the second terminal device functions as a communicational terminal device. In other embodiments, the first terminal device and the second terminal device are a single terminal device associated with the user. In such embodiments, the single terminal device functions as both an operational terminal device and a communicational terminal device.

At S303, the server device authenticates the service request at the first terminal device in accordance with a determination that the received verification code is identical to the verification code sent to the second terminal device. Specifically, the user (or equivalently, the first terminal device) is authenticated to access and/or to use the online service if the two verification codes match. In other words, if the verification code previously sent to a user (i.e., to the second terminal device) is identical to the verification code used by a user for user authentication (i.e., at the first terminal device), the server device determines that the two users are the same user, thus authorizing the user to access the online service using the first terminal device.

In some embodiments, each verification code sent to a user (e.g., to a terminal device associated with the user) is associated with a timestamp that indicates the time when the verification code is sent to the user, or a clock that indicates how long it has passed since the verification code is sent to the user. Such a timestamp or clock can be maintained at the server device. In such embodiments, a verification code sent to a user typically will expire after a certain period of time. When a verification code is received at the server device for user authentication, the server device can determine whether that verification code has expired or not based on the timestamp or clock associated with the verification code. If the verification code has not expired and matches the corresponding verification code sent to the user, the user is authenticated. Otherwise, if the verification has expired or the verification code does not match the corresponding verification code sent to the user, the user is not authenticated.

In some embodiments, after the user is authenticated, the server device can send a signal to the first terminal device and/or the second terminal device, which indicates the successful user authentication to the user. The user can then operate the first terminal device to access and/or use the online service. In some embodiments, after the user fails user authentication, the server device can send a signal to the first terminal device and/or the second terminal device, which indicates the failure of user authentication to the user. Furthermore, the first terminal device and/or the second terminal device can present a message prompting the user to reenter the verification code, and/or to restart and go through the user authentication process again. Additionally, in some embodiments, in response to consecutive failures of user authentication where the number of failures is greater than a predefined threshold, the account of the user can be locked out. As a result, user authentication for that user is prohibited or blocked for a period of time (e.g., 24 hours). After the period of time, the user can restart the user authentication process.

In some embodiments, user authentication is associated with the user only, but not any particular terminal device used by the user to send the service request or to access the online service. In such embodiments, for example, the user can use a first terminal device (e.g., an operational terminal device) to send a service request to the terminal device, use a second terminal device (e.g., a communicational terminal device) to receive the verification code, and then use a third terminal device (e.g., another operational terminal device) to enter the verification code and accomplish user authentication. In such embodiments, the server device can perform the user authentication process without receiving or processing any identification information of the first terminal device or the third terminal device (e.g., a media access control (MAC) address, an IP address, etc.). The server device can identify and authenticate the user based only on identification information of the user (e.g., a user ID, an account number, etc.) and identification information of the second terminal device (e.g., a phone number, etc.).

In other embodiments, user authentication is associated with both the user and the particular terminal device used by the user to send the service request and to access the online service. In such embodiments, for example, the user can use a first terminal device (e.g., an operational terminal device) to send a service request to the terminal device, use a second terminal device (e.g., a communicational terminal device) to receive the verification code, and then have to use the first terminal device again to enter the verification code and accomplish user authentication. In such embodiments, the server device receives and processes identification information of the first terminal device in performing the user authentication process. The server device identifies and authenticates the user based on identification information of the user (e.g., a user ID, an account number, etc.), identification information of the first terminal device (e.g., a MAC address, an IP address, etc.), and identification information of the second terminal device (e.g., a phone number, etc.).

Figure 4:
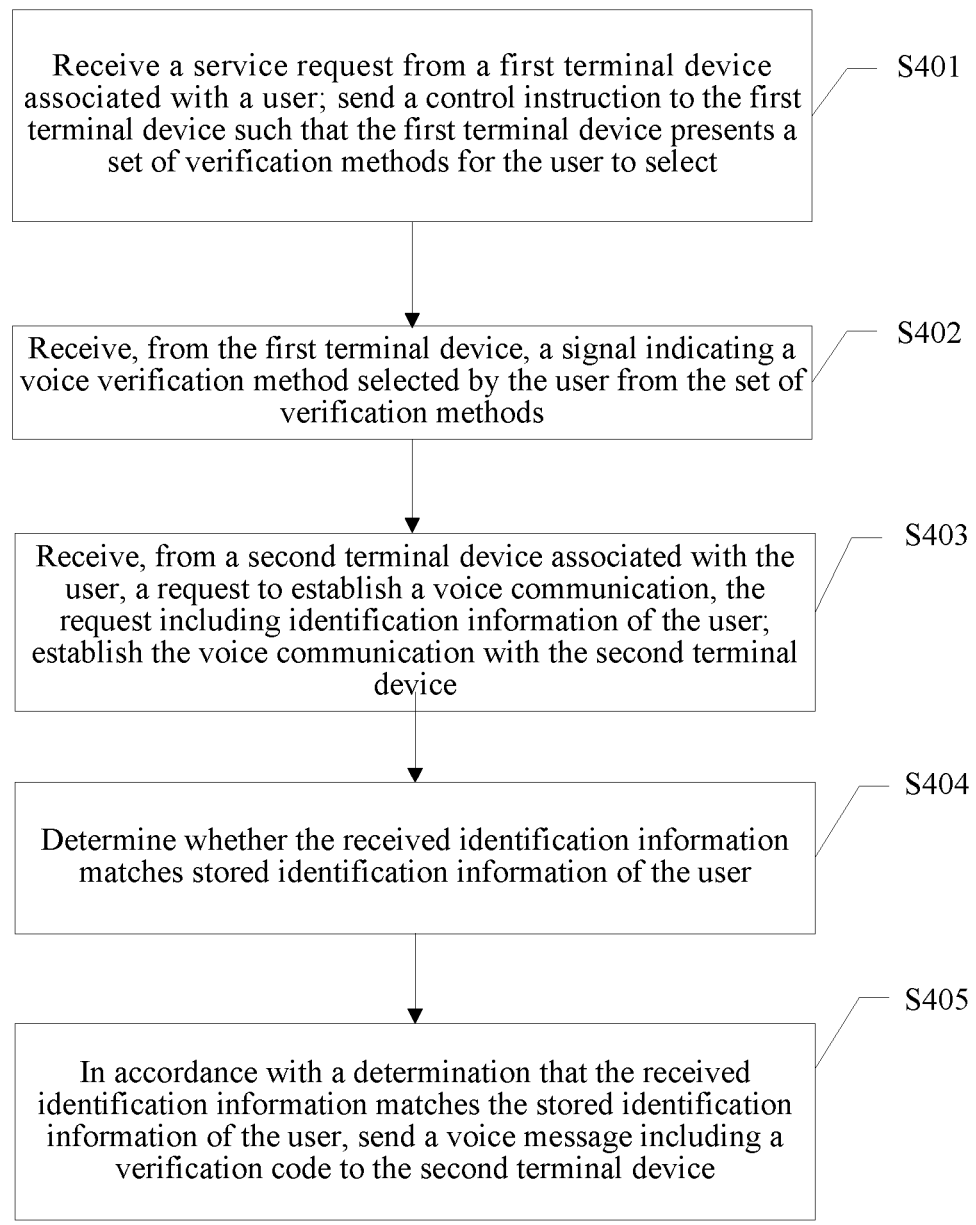
FIG. 4 is a flow chart illustrating another method performed at a server device associated with user authentication in accordance with some embodiments.

FIG. 4 is a flow chart illustrating a method 400 performed at a server device associated with user authentication in accordance with some embodiments. The server device performing the method 400 can be similar to the server devices shown and/or described above with respect to FIGS. 1-3. Particularly, the server device performing the method 400 is operatively coupled to at least one terminal device associated with (e.g., owned by, operated by, registered under the name of, etc.) a user. The server device and the terminal device(s) are configured to collectively provide an online service to the user, and to perform user authentication for the user as described below. In some embodiments, as described below, operations of the method 400 include operations of the method 200 in FIG. 2. In such embodiments, the method 400 describes a process that comprises the process of the method 200 as described above with respect to FIG. 2.

In some embodiments, the server device performing the method 400 can include one or more processors and memory. In such embodiments, the method 400 is governed by instructions or code of an application that are stored in a non-transitory computer readable storage medium of the server device and executed by the one or more processors of the server device. The application is associated with authenticating users with respect to accessing and using the online service. In some embodiments, such an application can have a server-side portion that is stored in and/or executed at the server device, and a client-side portion that is stored in and/or executed at the terminal device(s) operatively coupled to the server device and operated by the user. As a result of the application (or the server-side portion of the application) being executed, the method 400 is performed at the server device. As shown in FIG. 4, the method 400 includes the following steps.

At S401, the server device receives a service request from a first terminal device associated with the user. In response to the service request, the server device sends a control instruction to the first terminal device such that the first terminal device presents a set of verification methods for the user to select. At S402, the server device receives, from the first terminal device, a signal indicating a voice verification method selected by the user from the set of verification methods.

In some embodiments, the first terminal device is an operational terminal device used by the user to access the online service. The set of verification methods includes one or multiple communication methods for the server device to send verification codes to users. In some embodiments, the set of verification methods includes at least one voice verification method. That is, the server device can send a voice message (e.g., in a phone call, in a video/audio conference, etc.) including a verification code to a terminal device associated with a user. In some embodiments, the set of verification methods includes at least one non-voice verification method. That is, the server device can send a non-voice message (e.g., a text message, an email, etc.) including a verification code to a terminal device associated with a user.

Figure 22:
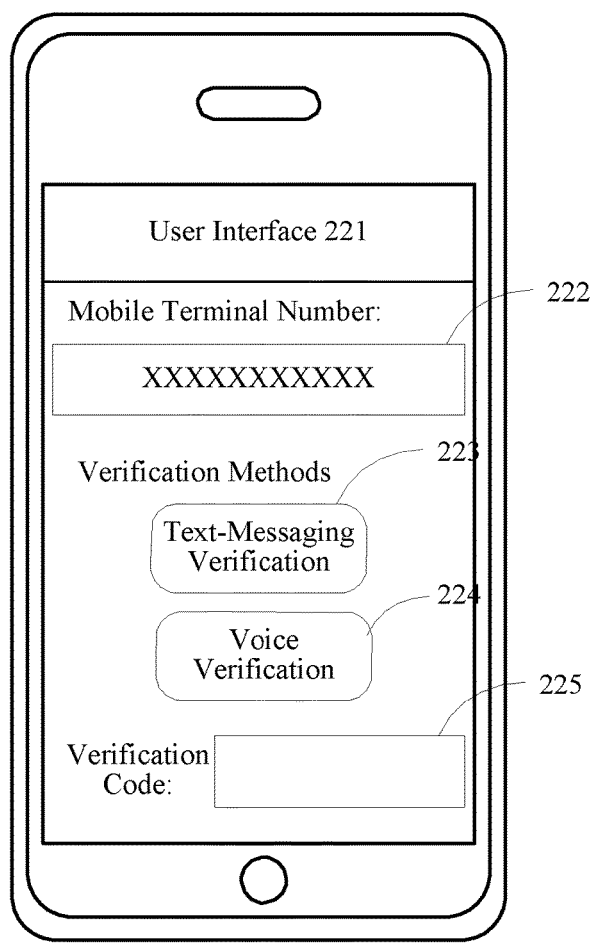
FIG. 22 is a schematic diagram illustrating a user interface of a terminal device in accordance with some embodiments.

As an example, FIG. 22 is a schematic diagram illustrating a user interface 221 of a terminal device 2200 in accordance with some embodiments. The terminal device 2200 can be similar to the terminal devices (e.g., the terminal devices 110, 120, 130) shown and described with respect to FIG. 1. Particularly, the terminal device 2200 is operated by a user to access an online service provided by a server device. The terminal device 2200 and the server device are configured to collectively perform a user authentication process for the user.

Specifically, the user operates the terminal device 2200 to send a service request to the server device. The terminal device 2200 receives, from the server device, a control instruction in response to the service request. In accordance with the control instruction, the terminal device 2200 displays the user interface 221 as shown in FIG. 22 to the user. As shown in FIG. 22, the user is prompted to enter a mobile terminal number, as a method to receive a verification code, into a text box 222 in the user interface 221. The mobile terminal number is identification information of the user (or identification information of a terminal device associated with the user).

In some embodiments, as an alternative, the server device can store and use a default contact method (e.g., a phone number) of the user. Such a default contact method can be determined based on, for example, a user ID or an account number of the user, which is included in the service request sent by the user to the server device. In such embodiments, the user may not be requested to provide contact information such as a phone number.

In accordance with the control instruction, the terminal device 2200 is configured to present a set of two verification methods for the user to select, shown as the "text-messaging verification" button 223 and the "voice verification" button 224 in FIG. 22. After entering a mobile terminal number into the text box 222, the user selects one of the two verification methods by activating (e.g., pressing, clicking) the corresponding button. As a result, the entered mobile terminal number as well as an indication of the selected verification method are sent from the terminal device 2200 to the server device, and subsequent procedure is performed at the server device accordingly.

Particularly, as described with respect to the method 300 in FIG. 3, the server device can send a verification code to the user (e.g., to a terminal device associated with the user that is linked to the mobile terminal number entered into the text box 222). After retrieving the verification code, the user can enter the verification code into the text box 225 in the user interface 221. The verification code is then sent from the terminal device 2200 to the server device, and the user can be authenticated based on the verification code at the server device, as described in the method 300.

Returning to FIG. 4, operations of S403-S405 are similar to operations of the method 200 shown and described above with respect to FIG. 2. Specifically, at S403 (corresponding to S201 in the method 200), the server device receives, from a second terminal device associated with the user, a request to establish a voice communication. The request includes identification information of the user. In response to the request, the server device establishes the voice communication with the second terminal device.

At S404 (corresponding to S202 in the method 200), the server device determines whether the received identification information matches stored identification information of the user. In some embodiments, for example and as shown in FIG. 22, the stored identification information of the user can be the mobile terminal number linked to a terminal device, which is entered by the user into the first terminal device and then sent to the server device. The received identification information can be a mobile terminal number linked to a terminal device that is connected to the server device via the voice communication. The server device detects, based on the voice communication, the mobile terminal number of the terminal device communicating with the server device. The server device then compares the detected mobile terminal number with the mobile terminal number previously received from the first terminal device. A match of the two mobile terminal numbers indicates that the terminal device in the voice communication with the server device and the terminal device to which the server device sent the verification code are the same terminal device. Subsequently, at S405 (corresponding to S203 in the method 200), the server device sends a voice message including a verification code to the second terminal device in accordance with a determination that the received identification information matches the stored identification information of the user.

Figure 5:
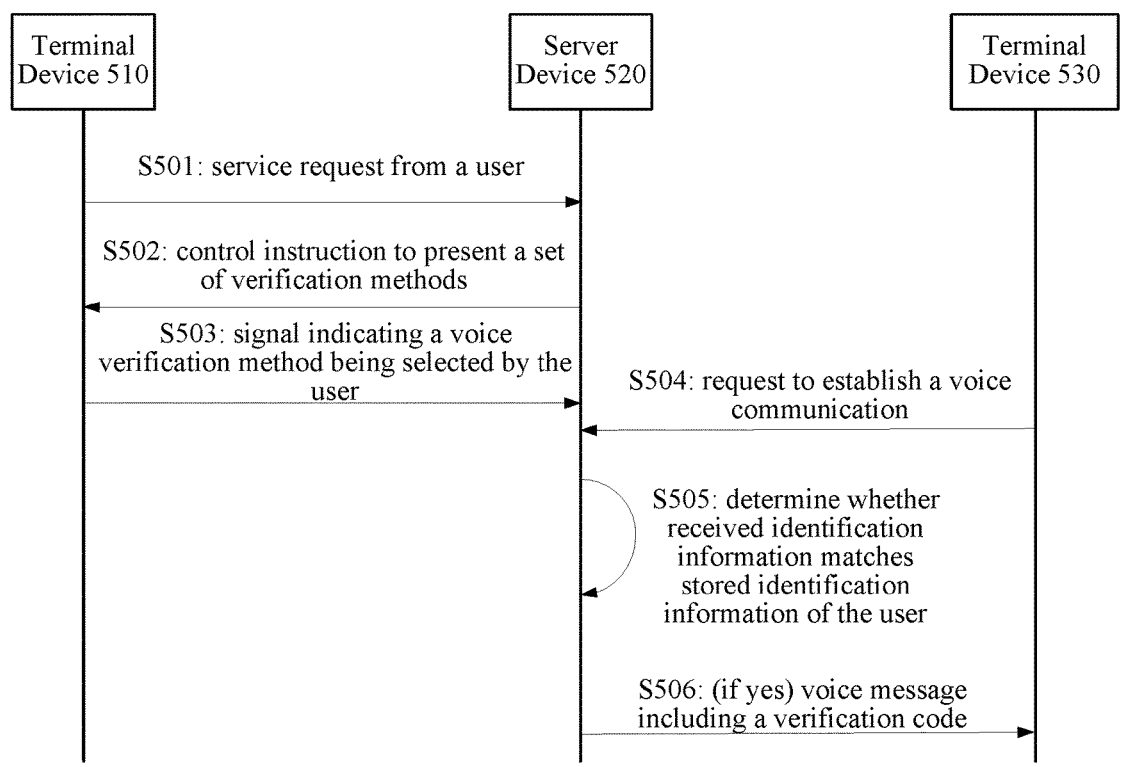
FIG. 5 is a schematic diagram illustrating the method in FIG. 4.

FIG. 5 is a schematic diagram illustrating the method in FIG. 4. Specifically, the server device 520 is the server device performing the method 400. The terminal device 510 is the first terminal device in the method 400, which can be an operational terminal device. The terminal device 530 is the second terminal device in the method 400, which can be a communicational terminal device. As shown in FIG. 5, the server device 520 is operatively coupled to the terminal device 510 and the terminal device 530. Although not shown in FIG. 5, both the terminal device 510 and the terminal device 530 are associated with (e.g., owned by, operated by, registered under the name of) a user. Although shown as two terminal devices in FIG. 5, in some other embodiments, the functionality of the terminal device 510 and the terminal device 520 can be implemented in a single terminal device. In such embodiments, such a single terminal device functions as both an operational terminal device and a communicational terminal device for user authentication.

In operation, at S501, the terminal device 510 sends a service request to the server device 520. The service request is initiated by the user and generated at the terminal device 510. The service request is associated with accessing and/or using an online service provided by the server device 520. Operations of S501 are similar to a portion of operations of S401 in the method 400.

At S502, the server device 520 sends a control instruction to the terminal device 510 to cause the terminal device 510 to present a set of verification methods for the user to select. For example, as shown in FIG. 22, the set of verification methods can include at least one voice verification method and/or one non-voice verification method. Operations of S502 are similar to the other portion of operations of S401 in the method 400.

At S503, the terminal device 510 sends a signal indicating a voice verification method selected by the user from the set of verification methods. For example, as shown in FIG. 22, the user can select the voice verification method by activating the button 224. Operations of S503 are similar to operations of S402 in the method 400.

At S504, the terminal device 530 sends a request to establish a voice communication to the server device 520. Such a request can be initiated by the user. For example, the user can use the terminal device 530 (e.g., a phone) to make a call to the server device 520. In response to the request, the server device 520 establishes the voice communication with the terminal device 530. Operations of S504 are similar to operations of S403 in the method 400.

In some embodiments, after receiving the signal in S503, the server device 520 expects to receive a request for voice communication from a terminal device associated with the user within a predefined period of time (e.g., 10 minutes). Alternatively, the limitation of the predefined period of time can be placed between receiving the request in S504 and, for example, receiving the request in S501, sending the control instruction in S502, or any other related event. In such embodiments, if the server device 520 receives the request in S504 within the predefined period of time, the server device 520 performs the subsequent operations of S505 and S506. Otherwise, if the server device 520 receives the request in S504 after the predefined period of time, the server device 520 can disregard the request and not perform the subsequent operations of S505 and S506.

In some embodiments, after the user operates the terminal device 510 to select a verification method (e.g., a voice verification method) from the set of verification methods presented by the terminal device 510, the terminal device 510 is configured to present an instruction to the user about the subsequent procedure for the user authentication process. For example, after the user selects a voice verification method, the terminal device 510 can present a message instructing the user to use a designated terminal device (e.g., the terminal device 530) to initiate a voice communication with the server device 520 by providing a phone number for the user to call. For another example, after the user selects a voice verification method, the terminal device 510 can present a message instructing the user to expect to receive a phone call to a designated terminal device (e.g., the terminal device 530) from the server device 520. For yet another example, after the user selects a non-voice verification method (e.g., a text messaging verification method), the terminal device 510 can present a message instructing the user to expect to receive a non-voice message (e.g., a text message) at a designated terminal device (e.g., the terminal device 530).

At S505, the server device 520 determines whether received identification information matches stored identification information of the user. Operations of S505 are similar to operations of S404 in the method 400. In some embodiments, the received identification information of the user can be identification information (e.g., a mobile terminal number) of the terminal device 530, which can be detected by the server device 520 based on the voice communication between the server device 520 and the terminal device 530. The stored identification information of the user can be identification information (e.g., a mobile terminal number) of a designated terminal device associated with the user, which is stored in a database accessible to the server device 520. Alternatively, the stored identification information of the user can be entered by the user using the terminal device 510, for example, along with the user selecting the voice verification method in S503. Thus, the server device S505 compares the stored identification information with the received identification information to determine whether the terminal device 530 (which currently is in the voice communication with the server device 520) is the designated terminal device of the user.

At S506, the server device 520 sends a voice message including a verification code to the terminal device 530 in accordance with a determination that the received identification information matches the stored identification information of the user. That is, if the server device 520 determines that the terminal device 530 is the designated terminal device of the user, the server device 520 sends the verification code (included in the voice message) to the terminal device 530. The verification code is generated by the server device 520 in response to the service request by the user in S501. Thus, the verification code is uniquely associated with the user and used for authentication of the user. As a result, after receiving the verification code using the terminal device 530, the user can use the verification code to authenticate the service request at the terminal device 510. Otherwise, if the server device 520 determines that the terminal device 530 is not the designated terminal device of the user, the server device 520 refrains from sending the verification code to the terminal device 530. As a result, the user is not authenticated at the terminal device 510. Operations of S506 are similar to operations of S405 in the method 400.

Although shown and described with respect to FIG. 5 as the terminal device 530 sending the request for voice communication to the server device 520 (in S504), in some other embodiments, the server device 520 can initiate the voice communication with the terminal device 530. In such embodiments, the server device 520 can send, to a designated terminal device of the user (e.g., the terminal device 530), a request to establish a voice communication. Furthermore, the server device 520 determines that the terminal device in the voice communication with the server device 520 is the designated terminal device of the user, thus eliminating the need for performing S505. In other words, if the server device 520 initiates the voice communication with a designated terminal device of the user, the server device 520 does not need to verify that the terminal device in voice communication with the server device 520 is indeed the designated terminal device of the user. As a result, S505 can be bypassed and the server device 520 can directly perform S506 (that is, sending the voice message including the verification code to the terminal device 530).

For example, after the user selects a voice verification method, the terminal device 510 is configured to present a message instructing the user to call a phone number associated with the server device 520. By following the instruction, the user uses a terminal device to make a phone call to that number, thus establishing a voice communication with the server device 520. The server device 520 then performs S505 to verify whether the terminal device in the voice communication with the server device 520 is a designated terminal device of the user or not. If the server device 520 determines that the terminal device in the voice communication with the server device 520 is a designated terminal device of the user, the server device 520 performs S506 to send a voice message including a verification code to the terminal device.

Alternatively, after the user selects a voice verification method, the terminal device 510 is configured to present a message instructing the user to expect a phone call from the server device to a designated terminal device of the user. Identification information (e.g., a phone number) of the designated terminal device can be previously provided to and stored at the server device, or recently provided to the server device (e.g., along with the selection of the voice verification method in S503). The server device 520 makes a phone call to the designated terminal device (e.g., the terminal device 530) of the user to establish a voice communication. By bypassing S505, the server device 520 then performs S506 to send a voice message including a verification code to the designated terminal device of the user.

Figure 6:
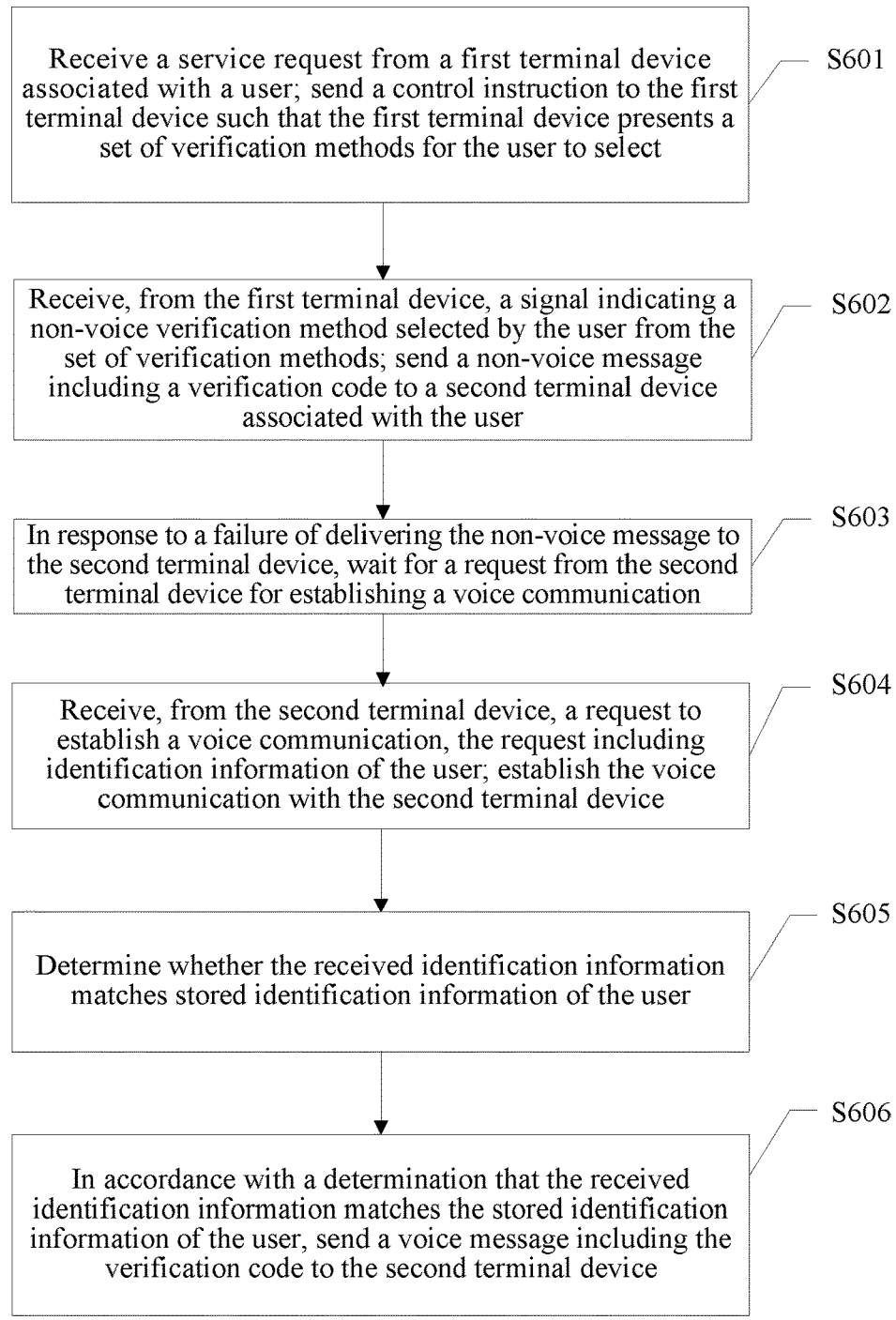
FIG. 6 is a flow chart illustrating another method performed at a server device associated with user authentication in accordance with some embodiments.

FIG. 6 is a flow chart illustrating a method 600 performed at a server device associated with user authentication in accordance with some embodiments. The server device performing the method 600 can be similar to the server devices shown and/or described above with respect to FIGS. 1-5. Particularly, the server device performing the method 600 is operatively coupled to at least one terminal device associated with (e.g., owned by, operated by, registered under the name of, etc.) a user. The server device and the terminal device(s) are configured to collectively provide an online service to the user, and to perform user authentication for the user as described below. In some embodiments, as described below, operations of the method 600 are similar to the operations of the method 400, and include operations of the method 200 in FIG. 2. In such embodiments, the method 600 describes a process that is similar to the process of the method 400, and comprises the process of the method 200.

In some embodiments, the server device performing the method 600 can include one or more processors and memory. In such embodiments, the method 600 is governed by instructions or code of an application that are stored in a non-transitory computer readable storage medium of the server device and executed by the one or more processors of the server device. The application is associated with authenticating users with respect to accessing and using the online service. In some embodiments, such an application can have a server-side portion that is stored in and/or executed at the server device, and a client-side portion that is stored in and/or executed at the terminal device(s) operatively coupled to the server device and operated by the user. As a result of the application (or the server-side portion of the application) being executed, the method 600 is performed at the server device. As shown in FIG. 6, the method 600 includes the following steps.

At S601, the server device receives a service request from a first terminal device associated with the user. In response to the service request, the server device sends a control instruction to the first terminal device such that the first terminal device presents a set of verification methods for the user to select. Operations of S601 are similar to operations of S401 in the method 400.

At S602, the server device receives, from the first terminal device, a signal indicating a non-voice verification method selected by the user from the set of verification methods. The server device then sends a non-voice message including a verification code to a second terminal device associated with the user. Operations of S602 are partially similar to operations of S402 in the method 400. The second terminal device can be a terminal device of the user designated to receive non-voice messages associated with user authentication. The second terminal device can be identified by the server device based on stored identification information of the user, or identification information provided by the user along with the selection of the non-voice verification method.

For example, as shown in FIG. 22, the user can select a text-messaging verification method (as a non-voice verification method) by activating the button 223. The user can also provide a mobile terminal number in the text box 222 as identification information for a designated terminal device (e.g., the second terminal device in the method 600) to receive non-voice messages (e.g., text messages) associated with user authentication. Alternatively, the server device communicating with the terminal device 2200 can determine a designated terminal device for the user based on stored information of the user. Accordingly, the server device can send a text message including a verification code to the designated terminal device of the user.

A voice verification method can be any verification method that involves sending a voice message including a verification code from a server device to a terminal device. For example, the server device sends an audio clip including a verification code to the terminal device and causes the terminal device to play the audio clip. For another example, the server device provides a verification code to the user during a phone call with the terminal device. A non-voice verification method can be any verification method that involves sending a non-voice message including a verification code from a server device to a terminal device. For example, the server device sends a text message including a verification code to the terminal device. For another example, the server device sends an email including the verification code to the terminal device. Particularly, a non-voice verification method does not involve sending a voice message including a verification code from a server device to a terminal device. Thus, a verification method cannot be both a voice verification method and a non-voice verification method.

At S603, in response to a failure of delivering the non-voice message to the second terminal device, the server device waits for a request from the second terminal device for establishing a voice communication. The failure of delivering the non-voice message to the second terminal device can be caused by various reasons. For example, a text message fails to be delivered to a cellular phone due to lack of signal for the cellular phone. For another example, an email fails to reach a computer due to network congestion and loss of data packets. For yet another example, an instant message fails to be delivered to a smart phone due to a malfunction of the instant messaging software application at the smart phone. In some embodiments, the server device can detect such a failure in any suitable method. For example, the server device can determine a failure in delivering the non-voice message based on not receiving an acknowledgment from the destined terminal device within a certain period of time.

In some embodiments, a voice verification method is not used unless a non-voice verification method fails to deliver the verification code. In such embodiments, a voice verification method is not adopted to deliver a verification code before a non-voice verification method is attempted and fails to deliver that verification code. In some embodiments, the user is instructed to initiate a voice communication with the server device in case the user does not receive a non-voice message including a verification code, for example, within a certain period of time (e.g., 10 minutes) after the user submits the selection of the non-voice verification method in S602. By following such an instruction, the user operates the second terminal device to send the request for voice communication in S604.

Alternatively, as described above, the server device can initiate establishing the voice communication with a designated terminal device (e.g., the second terminal device) of the user. For example, the server device can make a phone call to a designated terminal device (e.g., a phone) of the user after the server device determines the failure of delivering the verification code via the non-voice verification method.

After the attempt to deliver the verification code to the user via the non-voice verification method fails, the server device performs operations of S604-S606 to deliver the verification code to the user via a voice verification method. As described above, either the server device or the terminal device (or equivalently, the user) can initiate the voice communication. Operations of S604-S606 are similar to operations of S403-S405. Specifically, at S604 (corresponding to S403 in the method 400), the server device receives, from the second terminal device, a request to establish a voice communication. The request includes identification information of the user. In response to the request, the server device establishes the voice communication with the second terminal device. At S605 (corresponding to S404 in the method 400), the server device determines whether the received identification information matches stored identification information of the user. At S606 (corresponding to S405 in the method 400), the server device sends a voice message including the verification code to the second terminal device in accordance with a determination that the received identification information matches the stored identification information of the user.

In some embodiments, the terminal device used in the non-voice verification method is the same as the terminal device used in the voice verification method. As described with respect to the method 600, the server device attempts to deliver the verification code via the non-voice verification method to the second terminal device. When the delivery fails, the server device delivers the verification code via the voice verification method to the second terminal device. In such embodiments, the second terminal device is capable of receiving both voice messages and non-voice messages. Thus, the second terminal device can be a designated terminal device of the user associated with both the non-voice verification method and the voice verification method.

In some other embodiments, the terminal device used in the non-voice verification method is different from the terminal device used in the voice verification method. In other words, the server device attempts to deliver the verification code via the non-voice verification method to a terminal device associated with the user. When the delivery fails, the server device delivers the verification code via the voice verification method to another terminal device associated with the user. In such embodiments, the two terminal devices are capable of receiving voice messages and non-voice messages, respectively. Thus, the user has a designated terminal device associated with the non-voice verification method and another designated terminal device associated with the voice verification method.

Figure 7:
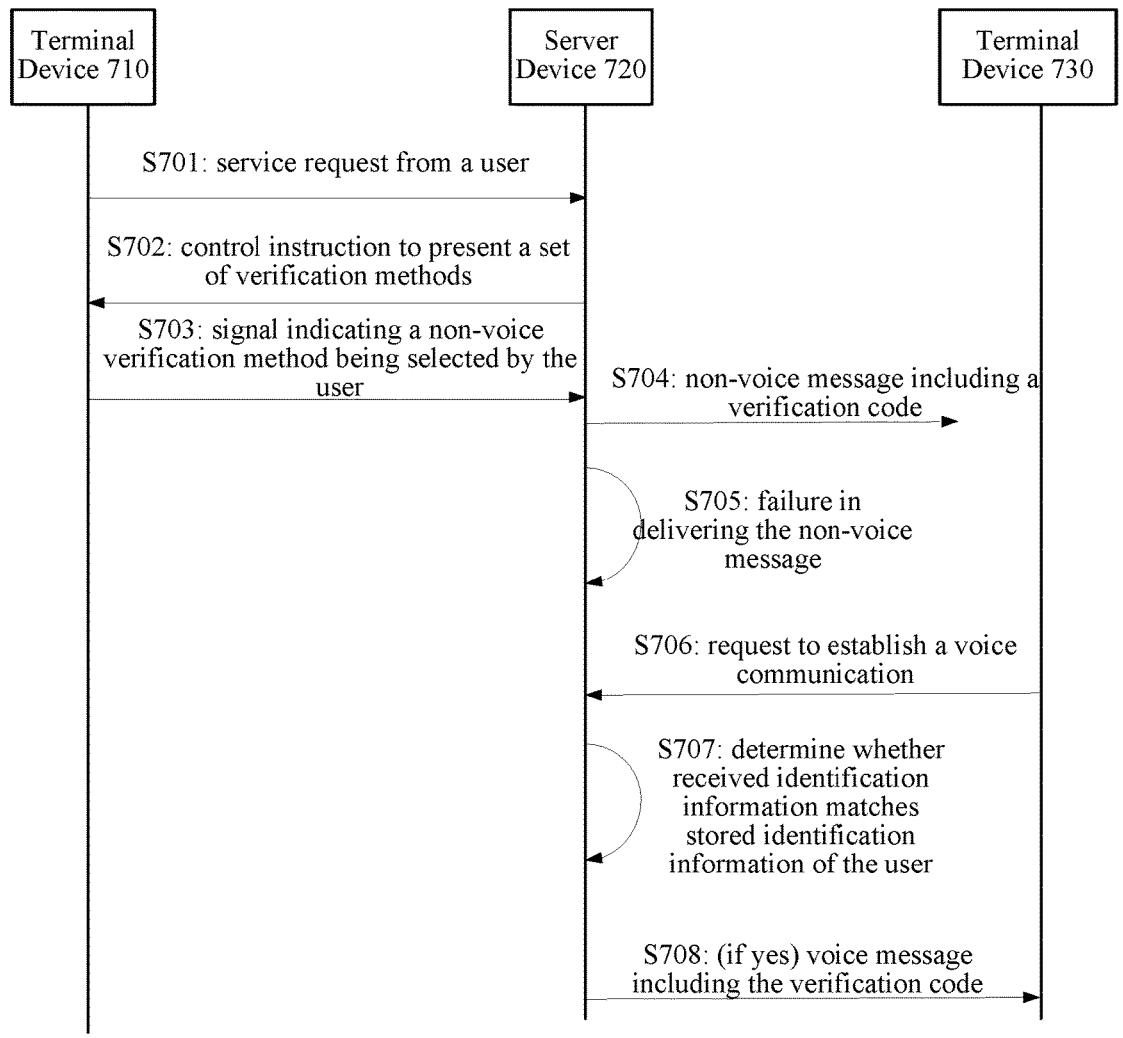
FIG. 7 is a schematic diagram illustrating the method in FIG. 6.

FIG. 7 is a schematic diagram illustrating the method in FIG. 6. Specifically, the server device 720 is the server device performing the method 600. The terminal device 710 is the first terminal device in the method 700, which can be an operational terminal device. The terminal device 730 is the second terminal device in the method 700, which can be a communicational terminal device. As shown in FIG. 7, the server device 720 is operatively coupled to the terminal device 710 and the terminal device 730. Although not shown in FIG. 7, both the terminal device 710 and the terminal device 730 are associated with (e.g., owned by, operated by, registered under the name of) a user. Although shown as two terminal devices in FIG. 7, in some other embodiments, the functionality of the terminal device 710 and the terminal device 720 can be implemented in a single terminal device. In such embodiments, such a single terminal device functions as both an operational terminal device and a communicational terminal device for user authentication.

In operation, at S701, the terminal device 710 sends a service request to the server device 720. The service request is initiated by the user and generated at the terminal device 710. The service request is associated with accessing and/or using an online service provided by the server device 720. Operations of S701 are similar to a portion of operations of S601 in the method 600.

At S702, the server device 720 sends a control instruction to the terminal device 710 to cause the terminal device 710 to present a set of verification methods for the user to select. For example, as shown in FIG. 22, the set of verification methods can include at least one voice verification method and/or one non-voice verification method. Operations of S702 are similar to the other portion of operations of S601 in the method 600.

At S703, the terminal device 710 sends a signal indicating a non-voice verification method selected by the user from the set of verification methods. For example, as shown in FIG. 22, the user can select the text-messaging verification method by activating the button 223. Operations of S703 are similar to a portion of operations of S602 in the method 600.

At S704, the server device 720 attempts to send a non-voice message including a verification code to the terminal device 730. The verification code is generated at the server device 720 in response to the service request in S701. Operations of S704 are similar to the other portion of operations of S602 in the method 600.

At S705, the server device 720 detects a failure in delivering the non-voice message to the terminal device 730. In response to the detection of such a failure, the server device 720 is configured to wait for a request from the second terminal device for establishing a voice communication. Operations of S705 are similar to operations of S603 in the method 600.

At S706, the terminal device 730 sends a request to establish a voice communication to the server device 720. Such a request can be initiated by the user. In response to the request, the server device 720 establishes the voice communication with the terminal device 730. Operations of S706 are similar to operations of S604 in the method 600.

At S707, the server device 720 determines whether received identification information matches stored identification information of the user. Operations of S707 are similar to operations of S605 in the method 600. At S708, the server device 720 sends a voice message including the verification code to the terminal device 730 in accordance with a determination that the received identification information matches the stored identification information of the user. Operations of S708 are similar to operations of S606 in the method 600.

Figure 8:
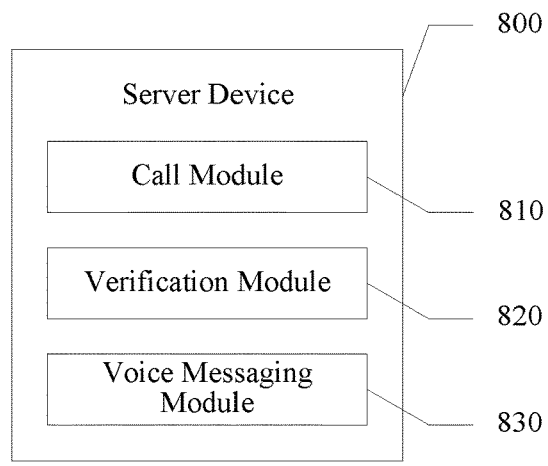
FIG. 8 is a block diagram illustrating modules of a server device configured to authenticate users for online services in accordance with some embodiments.

FIG. 8 is a block diagram illustrating modules of a server device 800 configured to authenticate users for online services in accordance with some embodiments. The server device 800 can be structurally and functionally similar to the server devices shown and/or described with respect to FIGS. 1-7. Particularly, the server device 800 can be operatively coupled to and communicate with at least one terminal device associated with (e.g., owned by, operated by, registered under the name of, etc.) a user. The server device 800 and the terminal device(s) are configured to collectively provide an online service to the user, and to perform user authentication for the user as described above with respect to FIGS. 2-7. As shown in FIG. 8, the server device 800 includes a call module 810, a verification module 820 and a voice messaging module 830. In some embodiments, a server device can include more or less modules than those shown in FIG. 8.

In some embodiments, each module included in the server device 800 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the server device 800 (not shown in FIG. 8) and executed at a processor (e.g., a CPU) of the server device 800 (not shown in FIG. 8). Overall, the call module 810, the verification module 820 and the voice messaging module 830 can be configured to collectively perform at least a portion (e.g., a server-side portion) of the methods 200-700 shown and described above with respect to FIGS. 2-7. In other words, the call module 810, the verification module 820 and the voice messaging module 830 can be configured to collectively perform user authentication for user(s) of the terminal device(s) in communication with the server device 800.

Specifically, the call module 810 is configured to, among other functions, establish a voice communication with a terminal device. In some embodiments, the call module 810 is configured to receive a request for voice communication from a terminal device. The call module 810 is configured to respond to the received request for voice communication such that a voice communication is established between the server device 800 and the terminal device. In such embodiments, the request for voice communication can include identification information of the user operating the terminal device, or identification information of the terminal device.

In some other embodiments, the call module 810 is configured to initiate a process to establish a voice communication with a terminal device. In such embodiments, the call module 810 can be configured to, for example, make a phone call to the terminal device, send a request for a video/audio conference to the terminal device, send a voice message to the terminal device, and/or the like. As a result, the terminal device responds to the initiating operation performed by the call module 810, thus establishing a voice communication between the server device 800 and the terminal device.

The verification module 820 is configured to, among other functions, determine whether received identification information matches stored identification information. Specifically, when the call module 810 receives a request for voice communication, the verification module 820 compares the identification information (e.g., identification information of a user, identification information of a terminal device) included in the request with stored identification information associated with users who are requesting an online service (e.g., identification information of a user, identification information of a terminal device associated with a user). If the verification module 820 determines a match between the received identification information and stored identification information of a user who is requesting an online service, it indicates that the request for voice communication is received from a terminal device associated with the user who is currently requesting an online service. Otherwise, if the verification module 820 determines no match between the received identification information and stored identification information of any user who is requesting an online service, it indicates that the request for voice communication is not received from a terminal device associated with any user who is currently requesting an online service.

The voice messaging module 830 is configured to, among other functions, send a voice message including a verification code to a terminal device associated with a user who is currently requesting an online service. The verification code is generated at the server device 800 in response to a service request received from the user. As described above with respect to the verification module 820, if the verification module 820 determines a match between the received identification information and stored identification information of a user who is currently requesting an online service, the voice messaging module 830 is configured to send a voice message including a corresponding verification code to the terminal device associated with the user, from which the request for voice communication is received. Subsequently, the user receives the verification code at the terminal device, and then uses the verification code to complete a user authentication process (e.g., at another terminal device associated with the user, from which the service request is received). Otherwise, if the verification module 820 determines no match between the received identification information and stored identification information of any user who is currently requesting an online service, the voice messaging module 830 refrains from sending a voice message including any verification code to the terminal device associated with the user, from which the request for voice communication is received.

Figure 9:
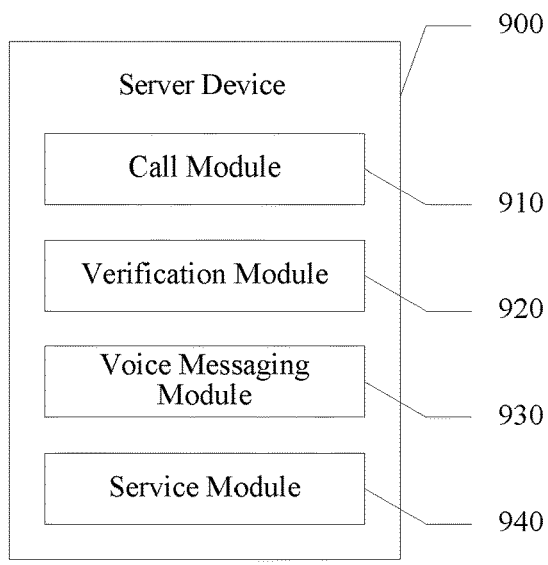
FIG. 9 is a block diagram illustrating modules of another server device configured to authenticate users for online services in accordance with some embodiments.

FIG. 9 is a block diagram illustrating modules of a server device 900 configured to authenticate users for online services in accordance with some embodiments. The server device 900 can be structurally and functionally similar to the server device 800 shown and described with respect to FIG. 8. Particularly, the server device 900 can be operatively coupled to and communicate with at least one terminal device associated with (e.g., owned by, operated by, registered under the name of, etc.) a user. The server device 900 and the terminal device(s) are configured to collectively provide an online service to the user, and to perform user authentication for the user as described above with respect to FIGS. 2-7. As shown in FIG. 9, the server device 900 includes a call module 910, a verification module 920, a voice messaging module 930 and a service module 940. In some embodiments, a server device can include more or less modules than those shown in FIG. 9.

In some embodiments, each module included in the server device 900 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the server device 900 (not shown in FIG. 9) and executed at a processor (e.g., a CPU) of the server device 900 (not shown in FIG. 9). Overall, the call module 910, the verification module 920, the voice messaging module 930 and the service module 940 can be configured to collectively perform at least a portion (e.g., a server-side portion) of the methods 200-700 shown and described above with respect to FIGS. 2-7. In other words, the call module 910, the verification module 920, the voice messaging module 930 and the service module 940 can be configured to collectively perform user authentication for user(s) of the terminal device(s) in communication with the server device 900.

Specifically, the call module 910, the verification module 920 and the voice messaging module 930 are functionally similar to the call module 810, the verification module 820 and the voice messaging module 830, respectively. Furthermore, the verification module 920 is configured to determine if a verification code received from a terminal device associated with a user with respect to a service request from the user is identical to a verification code previously sent to the user (e.g., to another terminal device associated with the user) with respect to the service request from the user. The verification module 920 is configured to compare the received verification code with the previously-sent verification code. If the two verification codes match, the server device 900 (e.g., the verification module 920) determines that the user operating the terminal device to request the online service is the same user who receives the verification code (e.g., via another terminal device) with respect to the service request. In other words, the user is authenticated with respect to requesting the online service.

The service module 940 is configured to, among other functions, provide online service(s) to authenticated user(s). Specifically, if the server device 900 (e.g., the verification module 920) authenticates a user with respect to requesting an online service (as described above), the service module 940 is configured to enable the user to access the online service, and to perform subsequent procedures to provide the online service to the user accordingly. Otherwise, if the server device 900 (e.g., the verification module 920) fails to authenticate a user with respect to requesting an online service, the service module 940 is configured to deny access of the user to the online service. In some embodiments, if user authentication fails, the server device 900 (e.g., the service module 940) is configured to send a signal to a terminal device associated with the user (e.g., the terminal device that sent the service request, or the terminal device that sent the request for voice communication), causing that terminal device to present a message prompting the user to reenter the verification code, and/or to restart and go through the user authentication process again. Additionally, in some embodiments, in response to consecutive failures of user authentication where the number of failures is greater than a predefined threshold, the server device 900 (e.g., the service module 940) is configured to lock out the account of the user. As a result, user authentication for that user is prohibited or blocked for a period of time. After the period of time, the user can restart the user authentication process.

Figure 10:
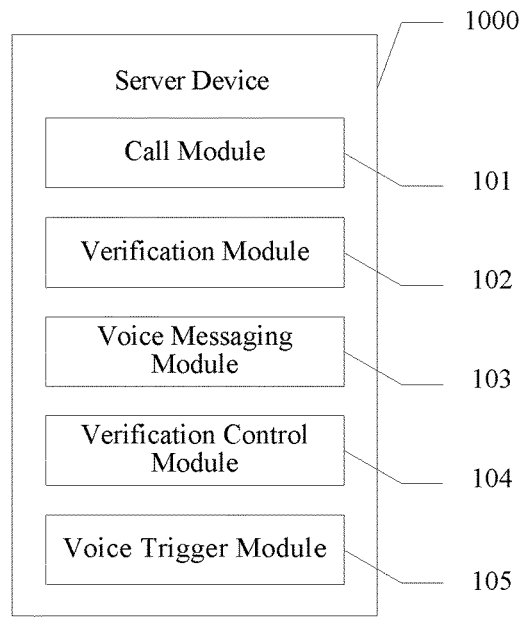
FIG. 10 is a block diagram illustrating modules of another server device configured to authenticate users for online services in accordance with some embodiments.

FIG. 10 is a block diagram illustrating modules of a server device 1000 configured to authenticate users for online services in accordance with some embodiments. The server device 1000 can be structurally and functionally similar to the server devices 800 and 900 shown and described with respect to FIGS. 8-9. Particularly, the server device 1000 can be operatively coupled to and communicate with at least one terminal device associated with (e.g., owned by, operated by, registered under the name of, etc.) a user. The server device 1000 and the terminal device(s) are configured to collectively provide an online service to the user, and to perform user authentication for the user as described above with respect to FIGS. 2-7. As shown in FIG. 10, the server device 1000 includes a call module 101, a verification module 102, a voice messaging module 103, a verification control module 104 and a voice trigger module 105. In some embodiments, a server device can include more or less modules than those shown in FIG. 10.

In some embodiments, each module included in the server device 1000 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the server device 1000 (not shown in FIG. 10) and executed at a processor (e.g., a CPU) of the server device 1000 (not shown in FIG. 10). Overall, the call module 101, the verification module 102, the voice messaging module 103, the verification control module 104 and the voice trigger module 105 can be configured to collectively perform at least a portion (e.g., a server-side portion) of the methods 200-700 shown and described above with respect to FIGS. 2-7. In other words, the call module 101, the verification module 102, the voice messaging module 103, the verification control module 104 and the voice trigger module 105 can be configured to collectively perform user authentication for user(s) of the terminal device(s) in communication with the server device 1000.

Specifically, the call module 101 and the voice messaging module 103 are functionally similar to the call module 810 and the voice messaging module 830, respectively. The verification module 102 is functionally similar to the verification module 820 and the verification module 920. Furthermore, the verification control module 104 is configured to, among other functions, control presentation of a set of verification methods at a terminal device associated with a user. Specifically, the verification control module 104 is configured to receive a service request from a terminal device associated with a user. The verification control module 104 is configured to send a control instruction to the terminal device to cause the terminal device to present a set of verification methods for the user to select. For example, as shown in FIG. 22, the set of verification methods can include at least one voice verification method and/or one non-voice verification method. Additionally, the verification control module 104 is configured to receive, from the terminal device, a signal indicating a verification method being selected from the set of verification methods.

The voice trigger module 105 is configured to, among other functions, process a signal received from the terminal device that indicates a voice verification method being selected by the user from the set of verification methods. In some embodiments, in response to the voice verification method being selected by the user, the voice trigger module 105 is configured to wait for a request for voice communication from a terminal device associated with the user. In some other embodiments, in response to the voice verification method being selected by the user, the voice trigger module 105 is configured to initiate the voice communication. For example, the voice trigger module 105 is configured to make a phone call to a terminal device associated with the user.

Figure 11:
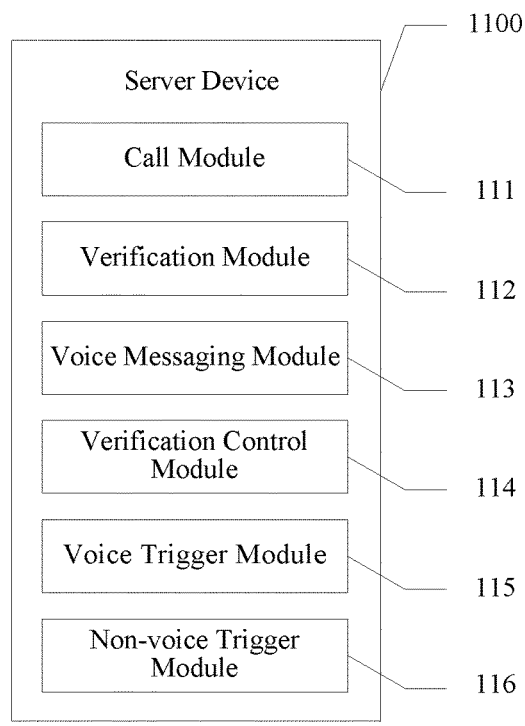
FIG. 11 is a block diagram illustrating modules of another server device configured to authenticate users for online services in accordance with some embodiments.

FIG. 11 is a block diagram illustrating modules of a server device 1100 configured to authenticate users for online services in accordance with some embodiments. The server device 1100 can be structurally and functionally similar to the server devices 800, 900 and 1000 shown and described with respect to FIGS. 8-10. Particularly, the server device 1100 can be operatively coupled to and communicate with at least one terminal device associated with (e.g., owned by, operated by, registered under the name of, etc.) a user. The server device 1100 and the terminal device(s) are configured to collectively provide an online service to the user, and to perform user authentication for the user as described above with respect to FIGS. 2-7. As shown in FIG. 11, the server device 1100 includes a call module 111, a verification module 112, a voice messaging module 113, a verification control module 114, a voice trigger module 115 and a non-voice trigger module 116. In some embodiments, a server device can include more or less modules than those shown in FIG. 11.

In some embodiments, each module included in the server device 1100 can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each module can be stored in a memory of the server device 1100 (not shown in FIG. 11) and executed at a processor (e.g., a CPU) of the server device 1100 (not shown in FIG. 11). Overall, the call module 111, the verification module 112, the voice messaging module 113, the verification control module 114, the voice trigger module 115 and the non-voice trigger module 116 can be configured to collectively perform at least a portion (e.g., a server-side portion) of the methods 200-700 shown and described above with respect to FIGS. 2-7. In other words, the verification control module 114, the voice trigger module 115 and the non-voice trigger module 116 can be configured to collectively perform user authentication for user(s) of the terminal device(s) in communication with the server device 1100.

Specifically, the call module 111 and the voice messaging module 113 are functionally similar to the call module 810 and the voice messaging module 830, respectively. The verification module 112 is functionally similar to the verification module 820 and the verification module 920. The verification control module 114 and the voice trigger module 115 are functionally similar to the verification control module 104 and the voice trigger module 105, respectively.

Furthermore, the non-voice trigger module 116 is configured to, among other functions, process a signal received from the terminal device that indicates a non-voice verification method being selected by the user from the set of verification methods. In some embodiments, in response to the non-voice verification method being selected by the user, the non-voice trigger module 116 is configured to send a non-voice message (e.g., a text message, an email, etc.) including a verification code to a terminal device associated with the user. In such embodiments, the non-voice trigger module 116 is also configured to detect a failure of delivering the non-voice message to the terminal device. Additionally, in such embodiments, the voice trigger module 115 is configured to, in response to the non-voice trigger module 116 detecting a failure of delivering the non-voice message to the terminal device, establish a voice communication with the terminal device (e.g., wait to receive a request for voice communication, initiate to establish the voice communication, etc.).

Figure 12:
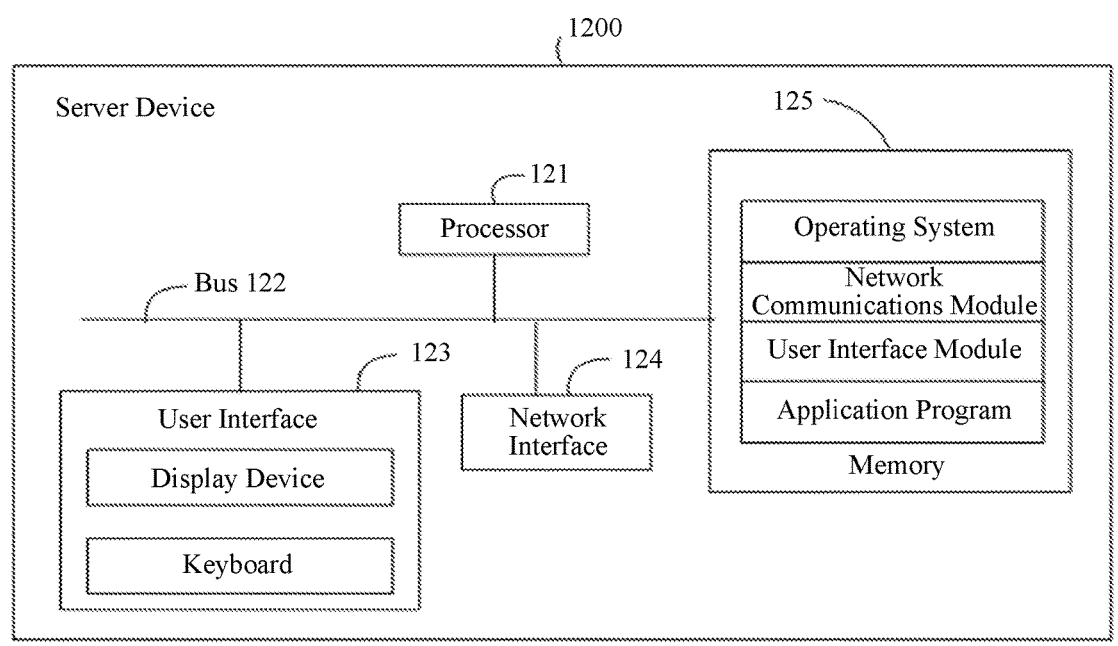
FIG. 12 is a schematic diagram illustrating components of a server device configured to authenticate users for online services in accordance with some embodiments.

FIG. 12 is a schematic diagram illustrating components of a server device 1200 configured to authenticate users for online services in accordance with some embodiments. The server device 1200 can be structurally and functionally similar to the server devices shown and/or described above with respect to FIGS. 1-11. As shown in FIG. 12, the server device 1200 includes a processor 121, a bus 122, a user interface 123, a network interface 124, and a memory 125. In some embodiments, a server device can include more or less devices, components and/or modules than those shown in FIG. 12.

The processor 121 can be any processing device capable of performing at least a portion (e.g., a server-side portion) of the methods 200-700 described with respect to FIGS. 2-7. Such a processor can be, for example, a CPU, a DSP, an ASIC, a FPGA, and/or the like. The processor 121 can be configured to control the operations of other components and/or modules of the server device 1200. For example, the processor 121 can be configured to control operations of the network interface 124 and the user interface 123. For another example, the processor 121 can be configured to execute instructions or code stored in a software program or module (e.g., a user authentication application) within the memory 125.

The bus 122 is configured to implement connections and communication among the other components of the server device 1200. The bus 122 can include, for example, a data bus, a communication bus, a power bus, a control bus, and/or the like. The user interface 123 is configured to interact with users operating the server device 1200 by using various input/output means. As shown in FIG. 12, the user interface 123 includes at least a display device (e.g., a screen, a monitor) and a keyboard. The display device is configured to display data and/or information in a visual form to users operating the server device 1200. The keyboard is configured to provide an input means to the users. In some embodiments, operations of the user interface 123 (e.g., the display device and the keyboard) are controlled by instructions or code stored in the user interface module within the memory 125.

The network interface 124 is configured to provide and control network interfaces of the server device 1200 that are used to interact with other network devices (e.g., terminal devices). The network interface 124 can include, for example, a standard wired interface and/or a standard wireless interface (e.g., a Wi-Fi interface). In some embodiments, the network interface 124 is used for connecting one or more terminal devices and performing data communication with the one or more terminal devices. In such embodiments, as described above with respect to FIGS. 1-11, the network interface 124 is configured to receive, for example, service requests, signals indicating selection of verification methods, requests for voice communication, verification codes entered by users for user authentication, etc., from other devices (e.g., terminal devices). The network interface 124 is also configured to transmit, for example, control instructions for presenting verification methods, requests for voice communication, messages (e.g., voice messages, non-voice messages) including verification codes, etc., to other devices (e.g., terminal devices). In some embodiments, operations of the network interface 124 are controlled by instructions or code stored in the network communications module within the memory 125.

In some embodiments, the memory 125 can include, for example, a random-access memory (RAM) (e.g., a DRAM, a SRAM, a DDR RAM, etc.), a non-volatile memory such as one or more magnetic disk storage devices, optical disk storage devices, flash memory devices, or other non-volatile solid state storage devices. In some embodiments, the memory 125 can include one or more storage devices (e.g., a removable memory) remotely located from other components of the server device 1200.

As shown in FIG. 12, the memory 125 includes at least an operating system, a network communications module, a user interface module and an application program. In some embodiments, each component, program, application or module included in the memory 125 can be a hardware-based module (e.g., a DSP, an ASIC, a FPGA), a software-based module (e.g., a module of computer code executed at a processor, a set of processor-readable instructions executed at a processor), or a combination of hardware and software modules. Instructions or code of each component, program, application or module can be stored in the memory 125 and executed at the processor 121. Particularly, at least a portion (e.g., a server-side portion) of the instructions or code of the methods 200-700 shown and described above with respect to FIGS. 2-7 are stored in the application program within the memory 125. In some embodiments, the processor 121 is configured to perform the instructions or code stored in the application program within the memory 125, as shown and described above with respect to the methods 200-700 in FIGS. 2-7.

Figure 13:
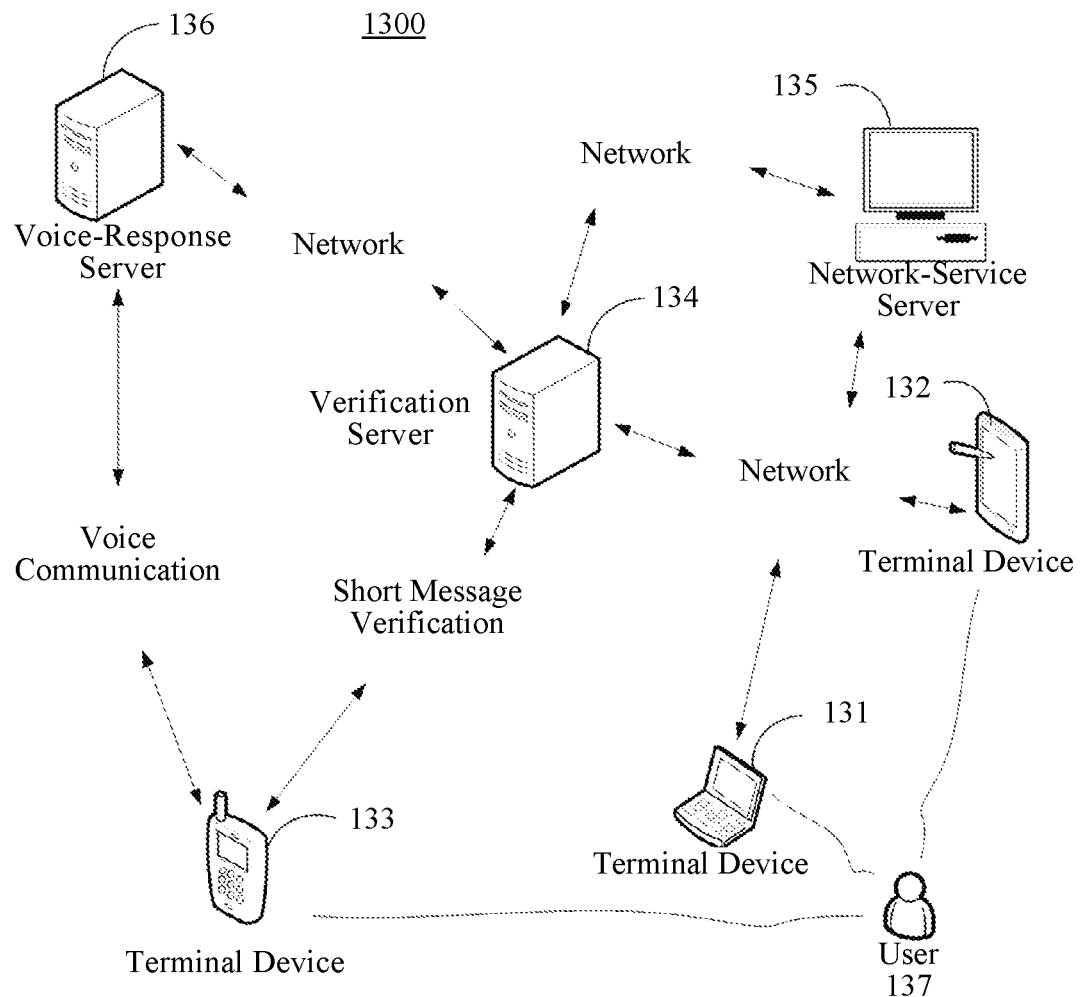
FIG. 13 is a schematic diagram illustrating another system configured to authenticate users for online services in accordance with some embodiments.

FIG. 13 is a schematic diagram illustrating a system 1300 configured to authenticate users for online services in accordance with some embodiments. The system 1300 is similar to the system 100 shown and described with respect to FIG. 1. As shown in FIG. 13, the system 1300 includes terminal devices 131, 132 and 133 operated by a user 137, a verification server 134, a voice-response server 136 and a network-service server 135. Each device of the system 1300 can be directly connected to or operatively coupled to (e.g., via a network) each other device of the system 1300. In some embodiments, although not shown in FIG. 13, a system configured for user authentication can include more than one verification server, network-service server or voice-response server operatively coupled to more or less terminal devices than those shown in FIG. 13.

The terminal devices 131, 132 and 133 are similar to the terminal devices 110, 120 and 130 shown and described with respect to FIG. 1. The user 137 is similar to the user 170 shown and described with respect to FIG. 1. The verification server 134, the network-service server 135 and the voice-response server 136 can collectively function as the server device 180 shown and described with respect to FIG. 1, as described in detail below and with respect to FIGS. 14-21. Additionally, the networks connecting the verification server 134, the network-service server 135, the voice-response server 136, and/or the terminal devices (e.g., the terminal devices 131-133) are similar to the networks 140, 150, 160 shown and described with respect to FIG. 1.

The network-service server 135 can be any type of device configured to host and provide online service(s) to users of the system 1300 (e.g., the user 137). In some embodiments, the network-service server 135 can be configured to host and provide one or multiple online services. In some embodiments, the system 1300 can include more than one network-service servers, each of which is configured to host and provide different online services. The verification server 134 can be any type of device configured to verify the identity of a user who makes a service request to the network-service server 135. Thus, the verification server 134 is configured to determine if a user is authenticated or not. In some embodiments, a verification server is also referred to as, for example, a user-authentication server, and/or the like. The voice-response server 136 can be any type of device configured to engage in voice communication with a terminal device associated with a user. The voice-response server 136 can also be configured to generate and send voice messages including verification codes to terminal devices. In some embodiments, the voice-response server 136 can be, for example, an IVR.

In operation, the network-service server 135 is configured to receive, from a first terminal device associated with a user (e.g., the terminal device 131 or 132 associated with the user 137), a service request associated with accessing an online service hosted at the network-service server 135. To determine if the requesting user is authorized to access the online service, the network-service server 135 is configured to send a verification request to the verification server 134.

In response to the verification request, the verification server 134 is configured to interact with the first terminal device to determine a verification method (e.g., a voice verification method, a non-voice verification method) for user authentication. If a voice verification method is selected by the user, the verification server 134 sends a signal to the voice-response server 136 to trigger a voice communication between the voice-response server 136 and a second terminal device associated with the user (e.g., the terminal device 133 associated with the user 137). In some embodiments, as described herein, the first terminal device and the second terminal device can be the same terminal device associated with a user. As a result, the voice-response server 136 is configured to establish a voice communication with the second terminal device, and then to send a voice message including a verification code to the second terminal device. The verification code can be generated at the verification server 134 in response to the service request, and then sent from the verification server 134 to the voice-response server 136.

Otherwise, if a non-voice verification method is selected by the user, the verification server 134 is configured to (e.g., trigger a non-voice response server not shown in FIG. 13 to) send a non-voice message including the verification code to the second terminal device. Furthermore, if the delivery of the non-voice message fails, the verification server sends a signal to the voice-response server 136 to trigger a voice communication between the voice-response server 136 and the second terminal device. As a result, the voice-response server 136 is configured to establish a voice communication with the second terminal device, and then to send a voice message including the verification code to the second terminal device.

Consequently, the verification code is delivered to the second terminal device associated with the user either by the voice verification method (performed at the voice-response server 136) or a non-voice verification method (performed at the verification server 134 or a non-voice response server not shown in FIG. 13). The user then enters the received verification code into the first terminal device. The verification server 134 is configured to verify the verification code received from the first terminal device. That is, the verification server 134 is configured to compare the verification code received from the first terminal device with the verification code previously sent to the second terminal device. The verification server 134 is configured authenticate the user based on a match of the two verification codes. As a result, the verification code 134 sends a signal to the network-service server 135, causing the network-service server 135 to provide access of the online service to the user.

Figure 14:
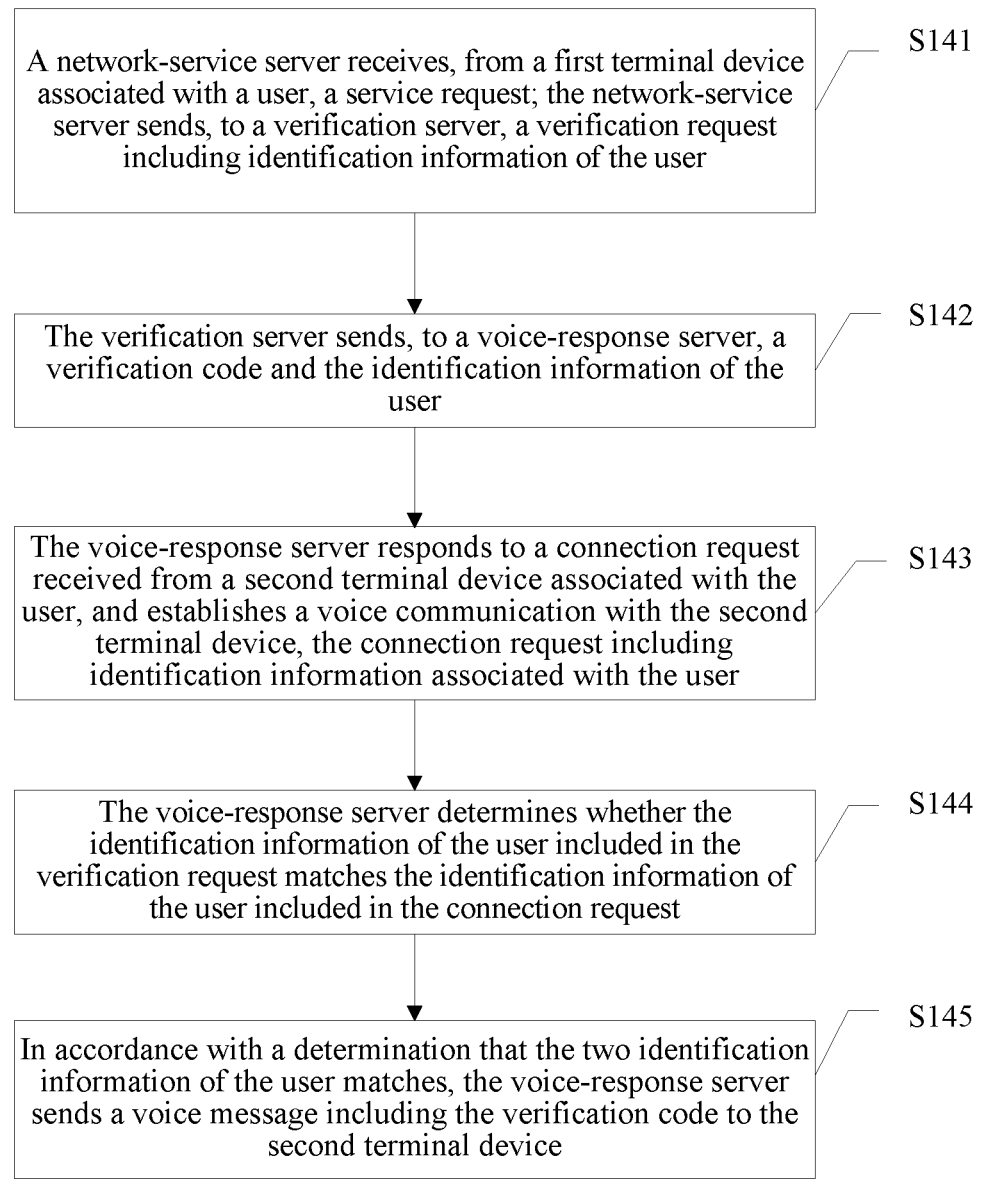
FIG. 14 is a flow chart illustrating another method performed at a system associated with user authentication in accordance with some embodiments.

FIG. 14 is a flow chart illustrating a method 1400 performed at a system associated with user authentication in accordance with some embodiments. The system performing the method 1400 is structurally and functionally similar to the system 1300 shown and described with respect to FIG. 13. Particularly, the system performing the method 1400 includes at least a network-service server (similar to the network-service server 135 in the system 1300), a verification server (similar to the verification server 134 in the system 1300), and a voice-response server (similar to the voice-response server 136 in the system 1300). Additionally, the system performing the method 1400 is operatively coupled to one or more terminal devices (e.g., the terminal devices 131, 132, 133 in FIG. 13) associated with one or more users (e.g., the user 137 in FIG. 13). The server devices of the system performing the method 1400 are configured to collectively perform user authentication for users with respect to accessing an online service hosted at the network-service server.

In some embodiments, each server device of the system performing the method 1400 can include one or more processors and memory. In such embodiments, the method 1400 is governed by instructions or code of an application that are stored in non-transitory computer readable storage mediums of the server devices and executed by the one or more processors of the server devices. The application is associated with authenticating users with respect to accessing and using the online service. In some embodiments, such an application can have server-side portions that are stored in and/or executed at the server devices of the system, and client-side portions that are stored in and/or executed at the terminal devices associated with the users. As a result of the application (or the server-side portions of the application) being executed, the method 1400 is performed at the server devices of the system. As shown in FIG. 14, the method 1400 includes the following steps.

Operations of S141-S143 are similar to operations of S201 of the method 200 in FIG. 2. At S141, the network-service server receives, from a first terminal device associated with a user, a service request. The service request includes identification information of the user. Such identification information of the user can be, for example, a phone number, a user name, an account number, an email address, etc., of the user. The identification information of the user can be used to uniquely identify the user and/or a terminal device associated with the user. The network-service server then sends, to the verification server, a verification request including the identification information of the user.

At S142, in response to the verification request, the verification server sends, to a voice-response server, a verification code and the identification information of the user. In some embodiments, the verification server is configured to generate the verification code in response to the service request. In some embodiments, the verification server is configured to present a set of verification methods (including at least one voice verification method and/or one non-voice verification method) to the user operating the first terminal device. The verification server then receives a selection of the voice verification method by the user from the set of verification methods. Consequently, the verification server sends the verification code and the identification information of the user to the voice-response server.

At S143, the voice-response server responds to a connection request received from a second terminal device associated with the user. The connection request includes identification information of the user. The voice-response server establishes a voice communication with the second terminal device. In some embodiments, alternatively, the voice-response server can initiate to establish a voice communication with the second terminal device. In such embodiments, the voice-response server can identify the second terminal device as a terminal device associated with the user based on the identification information of the user. The voice-response server then sends a signal (e.g., makes a phone call, sends an instant message, sends a video/audio chat invitation, etc.) to the second terminal device to initiate the voice communication.

At S144, the voice-response server determines whether the identification information of the user included in the verification request matches the identification information of the user included in the connection request. If the two identification information matches, the voice-response server determines that the second terminal device (which sent the connection request to the voice-response server) is operated by the same user as that operating the first terminal device (which sent the service request to the verification server). Thus, the identity of the user that operates the second terminal device is verified. Operations of S144 are similar to operations of S202 of the method 200 in FIG. 2.

At S145, in accordance with a determination that the two identification information of the user matches, the voice-response server sends a voice message including the verification code to the second terminal device. That is, after the voice-response server verifies the identity of the user that operates the second terminal device, the voice-response server provides the verification code to the user by sending the voice message including the verification code to the second terminal device. Consequently, the user receives the verification code and then can use the verification code for user authentication at the first terminal device. Operations of S145 are similar to operations of S203 of the method 200 in FIG. 2.

FIG. 15 is a flow chart illustrating a method 1500 performed at a system associated with user authentication in accordance with some embodiments. The system performing the method 1500 is structurally and functionally similar to the system 1300 shown and described with respect to FIG. 13. Particularly, the system performing the method 1500 includes at least a network-service server (similar to the network-service server 135 in the system 1300), a verification server (similar to the verification server 134 in the system 1300), and a voice-response server (similar to the voice-response server 136 in the system 1300). Additionally, the system performing the method 1500 is operatively coupled to one or more terminal devices (e.g., the terminal devices 131, 132, 133 in FIG. 13) associated with one or more users (e.g., the user 137 in FIG. 13). The server devices of the system performing the method 1500 are configured to collectively perform user authentication for users with respect to accessing an online service hosted at the network-service server. Furthermore, in some embodiments, the system is configured to perform the method 1500 after performing the method 1400 in FIG. 14. In such embodiments, the method 1500 describes a process subsequent to the process of the method 1400 as described above with respect to FIG. 14.

In some embodiments, each server device of the system performing the method 1500 can include one or more processors and memory. In such embodiments, the method 1500 is governed by instructions or code of an application that are stored in non-transitory computer readable storage mediums of the server devices and executed by the one or more processors of the server devices. The application is associated with authenticating users with respect to accessing and using the online service. In some embodiments, such an application can have server-side portions that are stored in and/or executed at the server devices of the system, and client-side portions that are stored in and/or executed at the terminal devices associated with the users. As a result of the application (or the server-side portions of the application) being executed, the method 1500 is performed at the server devices of the system. As shown in FIG. 15, the method 1500 includes the following steps.

At S151, the verification server receives a verification code from a first terminal device associated with a user requesting a service. As described above with respect to the method 1400 in FIG. 14, the user operated the first terminal device to send a service request to the network-service server. The network-service server sent a verification request to the verification server in response to the service request. The verification server then generated the verification code in response to the verification request, and caused the voice-response server to send the verification code to a second terminal device associated with the user. Operations of S151 are similar to operations of S301 of the method 300 in FIG. 3.

At S152, the verification server compares the received verification code with a verification code included in a voice message sent from the voice-response server to the second terminal device associated with the user. The second terminal device can be the same as the first terminal device or different from the first terminal device. As described above with respect to the method 1400 in FIG. 14, the voice-response server sent the voice message including the verification code to the second terminal device. Operations of S152 are similar to operations of S302 of the method 300 in FIG. 3.

At S153, in accordance with a determination that the received verification code is identical to the verification code included in the voice message, the verification server authenticates the user for the service and sends a signal indicating the successful user authentication to the network-service server. In other words, if the two verification codes match, the verification server determines that the user operating the first terminal device to submit the verification code is the same user who received the verification code via the second terminal device. Thus, the user is authenticated, and information of such a successful user authentication is sent to the network-service server. As a result, at S154, the network-service server provides the service to the first terminal device in response to receiving the signal. Operations of S153 are similar to operations of S303 of the method 300 in FIG. 3.

Figure 16:
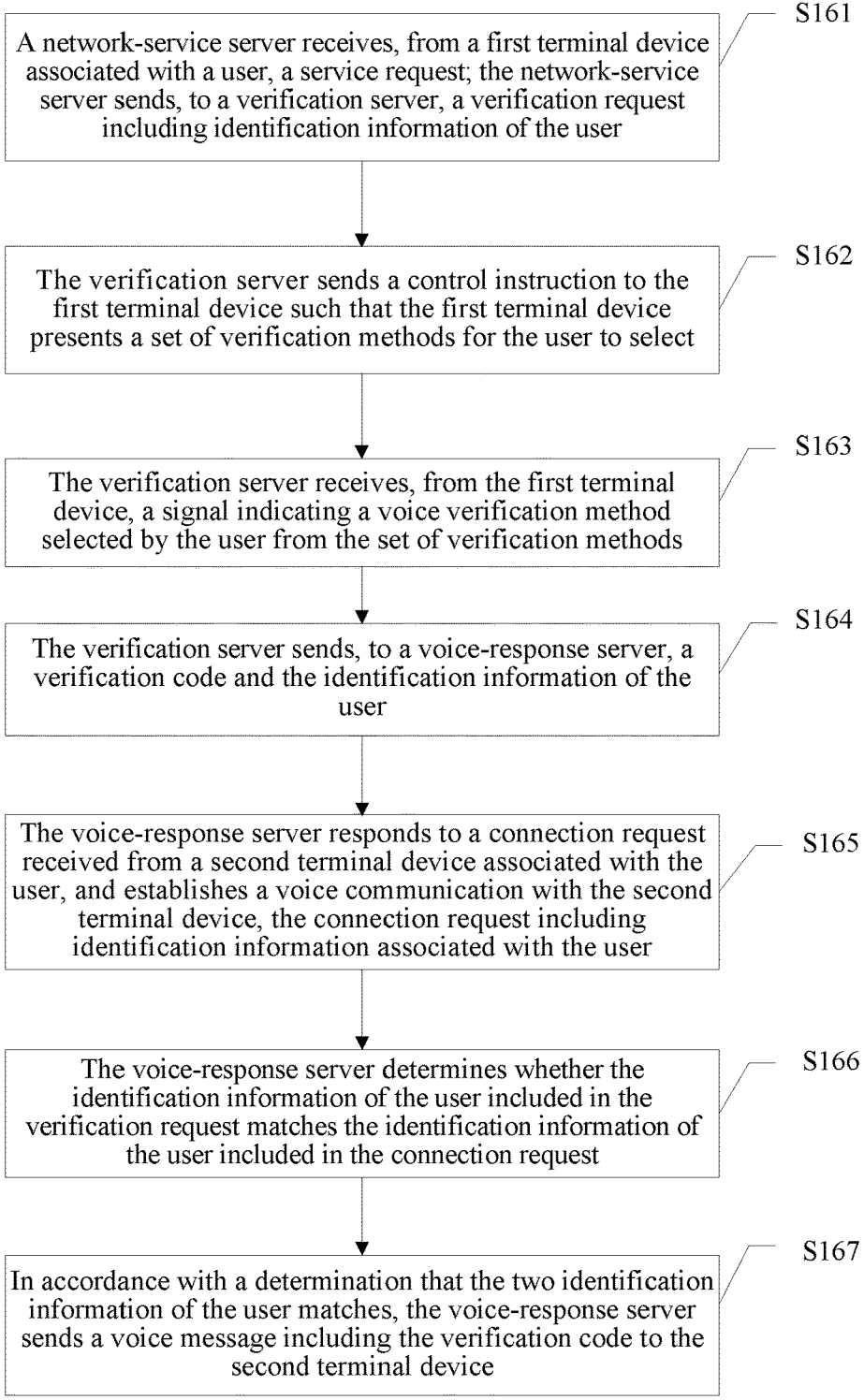
FIG. 16 is a flow chart illustrating another method performed at a system associated with user authentication in accordance with some embodiments.

FIG. 16 is a flow chart illustrating a method 1600 performed at a system associated with user authentication in accordance with some embodiments. The system performing the method 1600 is structurally and functionally similar to the system 1300 shown and described with respect to FIG. 13. Particularly, the system performing the method 1600 includes at least a network-service server (similar to the network-service server 135 in the system 1300), a verification server (similar to the verification server 134 in the system 1300), and a voice-response server (similar to the voice-response server 136 in the system 1300). Additionally, the system performing the method 1600 is operatively coupled to one or more terminal devices (e.g., the terminal devices 131, 132, 133 in FIG. 13) associated with one or more users (e.g., the user 137 in FIG. 13). The server devices of the system performing the method 1600 are configured to collectively perform user authentication for users with respect to accessing an online service hosted at the network-service server.

In some embodiments, each server device of the system performing the method 1600 can include one or more processors and memory. In such embodiments, the method 1600 is governed by instructions or code of an application that are stored in non-transitory computer readable storage mediums of the server devices and executed by the one or more processors of the server devices. The application is associated with authenticating users with respect to accessing and using the online service. In some embodiments, such an application can have server-side portions that are stored in and/or executed at the server devices of the system, and client-side portions that are stored in and/or executed at the terminal devices associated with the users. As a result of the application (or the server-side portions of the application) being executed, the method 1600 is performed at the server devices of the system. As shown in FIG. 16, the method 1600 includes the following steps.

Operations of S161-S162 are similar to operations of S401 of the method 400 in FIG. 4. At S161, the network-service server receives, from a first terminal device associated with a user, a service request. The service request is associated with accessing an online service hosted at the network-service server. The network-service server sends, to the verification server, a verification request including identification information of the user. The identification information of the user can be included in the service request.

At S162, the verification server sends a control instruction to the first terminal device such that the first terminal device presents a set of verification methods for the user to select. As shown and described with respect to FIG. 22, the set of verification methods can include at least one voice verification method and/or one non-voice verification method. The first terminal device can present a message prompting the user to select one verification method from the set of verification methods.

At S163, the verification server receives, from the first terminal device, a signal indicating a voice verification method selected by the user from the set of verification methods. For example, as shown and described with respect to FIG. 22, the user can select the voice verification method by entering a mobile number into the text box 222 and then activating (e.g., clicking) the button 224. As a result, the entered mobile number and information of the selected voice verification method are sent from the first terminal device to the verification server. Operations of S163 are similar to operations of S402 of the method 400 in FIG. 4.

Operations of S164-S165 are similar to operations of S403 of the method 400 in FIG. 4. At S164, in response to receiving the signal indicating the selected voice verification method, the verification server sends, to the voice-response server, a verification code and the identification information of the user. The verification code can be generated at the verification server in response to the service request. As a result, for example, the voice-response server can enter a wait mode and expect to receive, from a terminal device associated with the user, a request for establishing a voice communication. Subsequently, at S165, the voice-response server responds to a connection request received from a second terminal device associated with the user. The connection request includes identification information associated with the user. Responding to the connection request, the voice-response server establishes a voice communication with the second terminal device.

At S166, the voice-response server determines whether the identification information of the user included in the verification request matches the identification information of the user included in the connection request. Operations of S166 are similar to operations of S404 of the method 400 in FIG. 4. At S167, in accordance with a determination that the two identification information of the user match, the voice-response server sends a voice message including the verification code to the second terminal device. Operations of S167 are similar to operations of S405 of the method 400 in FIG. 4.

Figure 17:
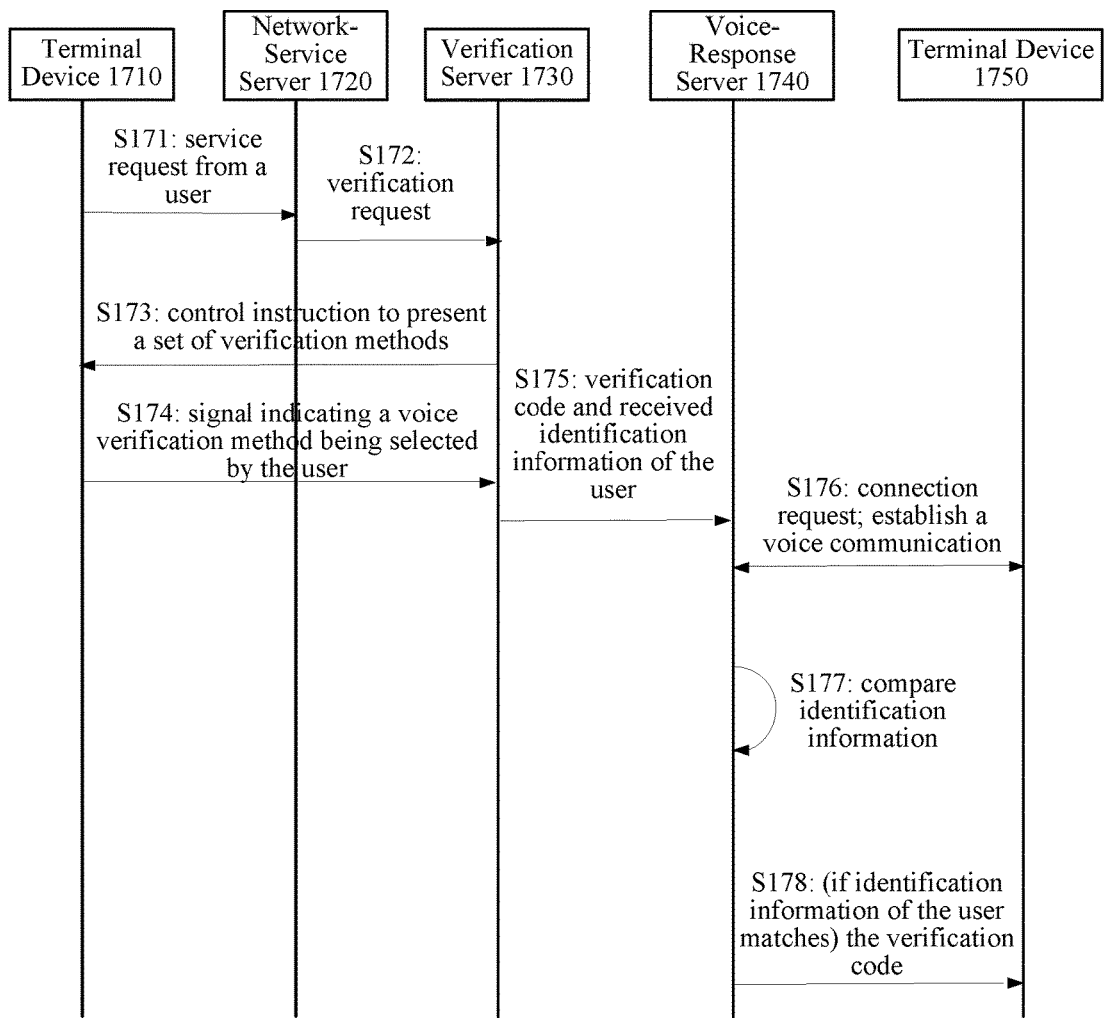
FIG. 17 is a schematic diagram illustrating the method in FIG. 16.

FIG. 17 is a schematic diagram illustrating the method in FIG. 16. Specifically, the network-service server 1720, the verification server 1730 and the voice-response server 1740 are the network-service server, the verification server and the voice-response server of the system performing the method 1600. The terminal device 1710 is the first terminal device in the method 1600, which can be an operational terminal device. The terminal device 1750 is the second terminal device in the method 1600, which can be a communicational terminal device. As shown in FIG. 17, the system (including the network-service server 1720, the verification server 1730 and the voice-response server 1740) is operatively coupled to the terminal device 1710 and the terminal device 1750. Although not shown in FIG. 17, both the terminal device 1710 and the terminal device 1750 are associated with (e.g., owned by, operated by, registered under the name of) a user. Although shown as two terminal devices in FIG. 17, in some other embodiments, the functionality of the terminal device 1710 and the terminal device 1750 can be implemented in a single terminal device. In such embodiments, such a single terminal device functions as both an operational terminal device and a communicational terminal device for user authentication.

In operation, at S171, the terminal device 1710 sends a service request to the network-service server 1720. The service request is initiated by the user and generated at the terminal device 1710. The service request is associated with accessing and/or using an online service hosted at and provided by the network-service device 1720. At S172, the network-service server 1720 sends a verification request to the verification server 1730. The verification request is based on the service request, and is associated with authenticating the user with respect to access to the online service. Operations of S171-172 are similar to operations of S161 in the method 1600.

At S173, the verification server 1730 sends a control instruction to the terminal device 1710 to cause the terminal device 1710 to present a set of verification methods for the user to select. For example, as shown in FIG. 22, the set of verification methods can include at least one voice verification method and/or one non-voice verification method. Operations of S173 are similar to operations of S162 in the method 1600.

At S174, the terminal device 1710 sends a signal indicating a voice verification method selected by the user from the set of verification methods. For example, as shown in FIG. 22, the user can select the voice verification method by activating the button 224. Operations of S174 are similar to operations of S163 in the method 1600.

At S175, in response to receiving the signal, the verification server 1730 sends, to the voice-response server 1740, a verification code and the received identification information of the user. The verification code can be generated at the verification server 1730 in response to the service request. Operations of S175 are similar to operations of S164 in the method 1600.

At S176, the voice-response server 1740 receives a connection request from the terminal device 1750. The connection request includes identification information associated with the user. Responding to the connection request, the voice-response server 1740 establishes a voice communication with the terminal device 1750. Operations of S176 are similar to operations of S165 in the method 1600.

At S177, the voice-response server 1740 compares identification information included in the connection request with identification information received from the verification server 1730 (which is included in the service request). The voice-response server 1740 then determines whether the two identification information matches, which indicates whether the terminal device 1750 is associated with the user who made the service request (at S171). Operations of S177 are similar to operations of S166 in the method 1600.

At S178, in accordance with a determination that the two identification information of the user matches, the voice-response server 1740 sends a voice message including the verification code to the terminal device 1750. In other words, if the voice-response server 1740 determines that the terminal device 1750 is associated with the user who made the service request (at S171), the voice-response server 1740 sends the voice message including the verification code to the terminal device 1750. Operations of S178 are similar to operations of S167 in the method 1600.

FIG. 18 is a flow chart illustrating another method performed at a system associated with user authentication in accordance with some embodiments. The system performing the method 1800 is structurally and functionally similar to the system 1300 shown and described with respect to FIG. 13. Particularly, the system performing the method 1800 includes at least a network-service server (similar to the network-service server 135 in the system 1300), a verification server (similar to the verification server 134 in the system 1300), and a voice-response server (similar to the voice-response server 136 in the system 1300). Additionally, the system performing the method 1800 is operatively coupled to one or more terminal devices (e.g., the terminal devices 131, 132, 133 in FIG. 13) associated with one or more users (e.g., the user 137 in FIG. 13). The server devices of the system performing the method 1800 are configured to collectively perform user authentication for users with respect to accessing an online service hosted at the network-service server.

In some embodiments, each server device of the system performing the method 1800 can include one or more processors and memory. In such embodiments, the method 1800 is governed by instructions or code of an application that are stored in non-transitory computer readable storage mediums of the server devices and executed by the one or more processors of the server devices. The application is associated with authenticating users with respect to accessing and using the online service. In some embodiments, such an application can have server-side portions that are stored in and/or executed at the server devices of the system, and client-side portions that are stored in and/or executed at the terminal devices associated with the users. As a result of the application (or the server-side portions of the application) being executed, the method 1800 is performed at the server devices of the system. As shown in FIG. 18, the method 1800 includes the following steps.

Operations of S181-S182 are similar to operations of S601 of the method 600 in FIG. 6. At S181, the network-service server receives, from a first terminal device associated with a user, a service request. The service request is associated with accessing an online service hosted at the network-service server. The network-service server sends, to the verification server, a verification request including identification information of the user. The identification information of the user can be included in the service request.

At S182, the verification server sends a control instruction to the first terminal device such that the first terminal device presents a set of verification methods for the user to select. As shown and described with respect to FIG. 22, the set of verification methods can include at least one voice verification method and/or one non-voice verification method. The first terminal device can present a message prompting the user to select one verification method from the set of verification methods.

At S183, the verification server receives, from the first terminal device, a signal indicating a non-voice verification method selected by the user from the set of verification methods. For example, as shown and described with respect to FIG. 22, the user can select the non-voice verification method by entering a mobile number into the text box 222 and then activating (e.g., clicking) the button 223. As a result, the entered mobile number and information of the selected non-voice verification method are sent from the first terminal device to the verification server. The verification server then sends, to the user (e.g., to a terminal device associated with the user), a non-voice message including a verification code. The verification code can be generated at the verification server based on the service request. Operations of S183 are similar to operations of S602 of the method 600 in FIG. 6.

Operations of S184-S185 are similar to operations of S603 of the method 600 in FIG. 6. At S184, The non-voice message fails to reach the user (e.g., fails to reach the terminal device associated with the user). The verification server detects such a failure. In response, at S185, the verification server sends, to the voice-response server, the verification code and the identification information of the user. As a result, the voice-response server is prepared to resend the verification code to the user using a voice verification method.

At S186, the voice-response server responds to a connection request received from a second terminal device associated with the user. The connection request includes identification information associated with the user. In response to the connection request, the voice-response server establishes a voice communication with the second terminal device. Operations of S186 are similar to operations of S604 of the method 600 in FIG. 6.

At S187, the voice-response server determines whether the identification information of the user included in the verification request matches the identification information of the user included in the connection request. In other words, the voice-response server compares the two identification information to determine whether the second terminal device is associated with the user who previously made the service request (at S181). Operations of S187 are similar to operations of S605 of the method 600 in FIG. 6.

At S188, in accordance with a determination that the two identification information of the user matches, the voice-response server sends a voice message including the verification code to the second terminal device. In other words, if the voice-response server determines that the second terminal device is associated with the user who previously made the service request (at S181), the voice-response server sends the verification code to the second terminal device via the voice message. Operations of S188 are similar to operations of S606 of the method 600 in FIG. 6.

Figure 19:
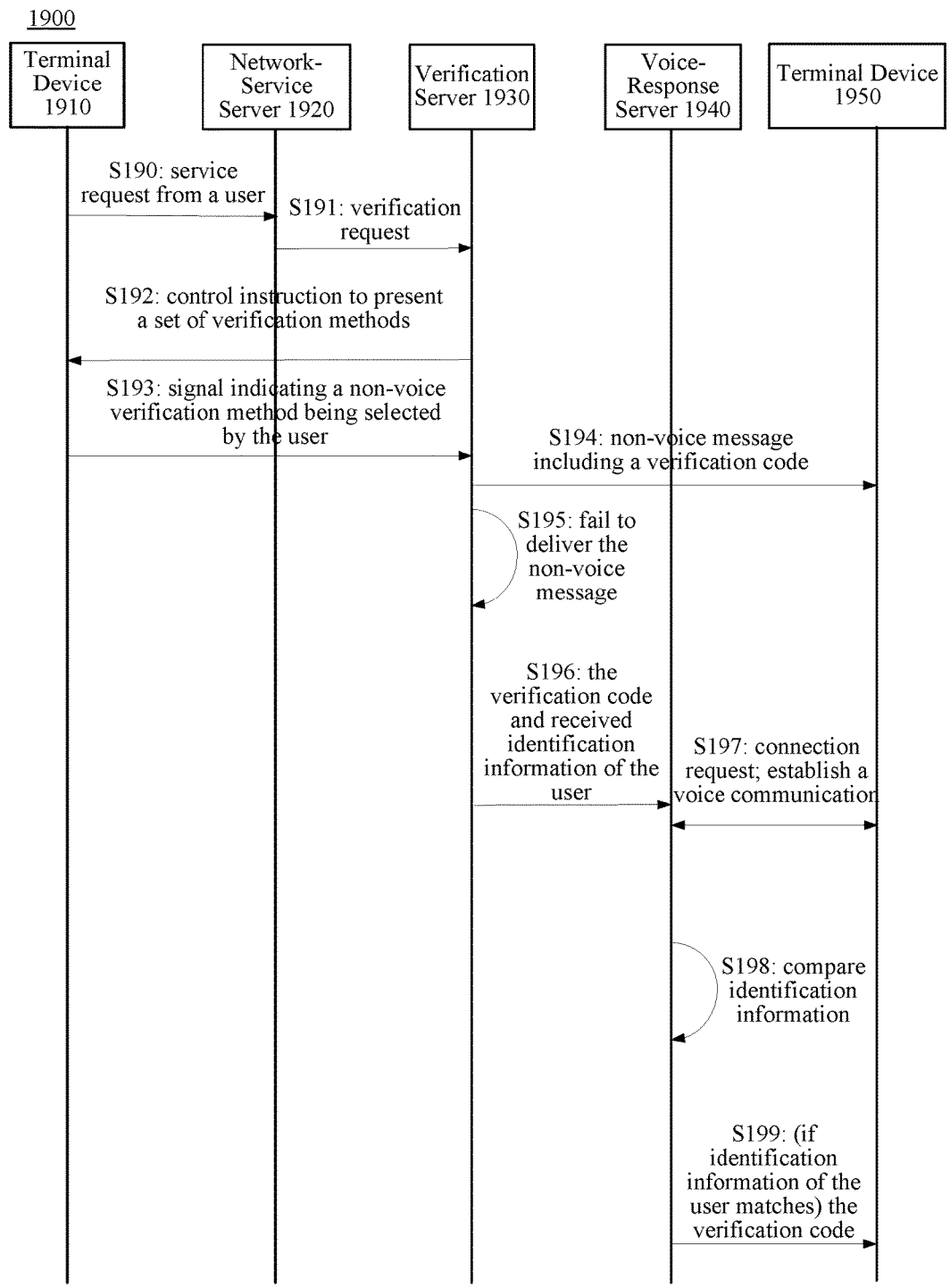
FIG. 19 is a schematic diagram illustrating the method in FIG. 18.

FIG. 19 is a schematic diagram illustrating the method in FIG. 18. Specifically, the network-service server 1920, the verification server 1930 and the voice-response server 1940 are the network-service server, the verification server and the voice-response server of the system performing the method 1800. The terminal device 1910 is the first terminal device in the method 1800, which can be an operational terminal device. The terminal device 1950 is the second terminal device in the method 1800, which can be a communicational terminal device. As shown in FIG. 19, the system (including the network-service server 1920, the verification server 1930 and the voice-response server 1940) is operatively coupled to the terminal device 1910 and the terminal device 1950. Although not shown in FIG. 19, both the terminal device 1910 and the terminal device 1950 are associated with (e.g., owned by, operated by, registered under the name of) a user. Although shown as two terminal devices in FIG. 19, in some other embodiments, the functionality of the terminal device 1910 and the terminal device 1950 can be implemented in a single terminal device. In such embodiments, such a single terminal device functions as both an operational terminal device and a communicational terminal device for user authentication.

In operation, at S190, the terminal device 1910 sends a service request to the network-service server 1920. The service request is initiated by the user and generated at the terminal device 1910. The service request is associated with accessing and/or using an online service hosted at and provided by the network-service device 1920. At S191, the network-service server 1920 sends a verification request to the verification server 1930. The verification request is based on the service request, and is associated with authenticating the user with respect to access to the online service. Operations of S190-S191 are similar to operations of S181 in the method 1800.

At S192, the verification server 1930 sends a control instruction to the terminal device 1910 to cause the terminal device 1910 to present a set of verification methods for the user to select. For example, as shown in FIG. 22, the set of verification methods can include at least one voice verification method and/or one non-voice verification method. Operations of S192 are similar to operations of S182 in the method 1800.

Operations of S193-S194 are similar to operations of S183 in the method 1800. At S193, the terminal device 1910 sends a signal indicating a non-voice verification method selected by the user from the set of verification methods. For example, as shown in FIG. 22, the user can select the non-voice verification method by activating the button 223. As a result, at S194, the verification server 1930 sends a non-voice message including a verification code to the terminal device 1950. The verification code can be generated at the verification server 1930 in response to the service request. In some embodiments, the verification server 1930 can cause, for example, a non-voice response server (not shown in FIG. 19) to send the non-voice message to the terminal device 1950. Furthermore, the verification server 1930 can monitor the sending of the non-voice message such that the verification server 1930 can detect whether the non-voice message is successfully delivered to the terminal device 1950 or not.

At S195, the verification server 1930 detects a failure of delivering the non-voice message to the terminal device 1950. That is, the verification code is not delivered to the user via the non-voice message. Operations of S195 are similar to operations of S184 in the method 1800. As a result, at S196, the verification server 1930 sends the verification code and received identification information of the user to the voice-response server 1940. Thus, the voice-response server 1940 is prepared to send the verification code to the user via a voice message. Operations of S196 are similar to operations of S185 in the method 1800.

At S197, the voice-response server 1940 receives a connection request from the terminal device 1950. The connection request includes identification information of the user. In response to the connection request, the voice-response server 1940 establishes a voice communication with the terminal device 1950. Operations of S197 are similar to operations of S186 in the method 1800.

At S198, the voice-response server 1940 compares the identification information included in the connection request with the identification information included in the service request (at S190) to determine whether the terminal device 1950 is associated with the user who previously made the service request (at S190). Operations of S198 are similar to operations of S187 in the method 1800.

At S199, in accordance with a determination that the two identification information of the user matches, the voice-response server 1940 sends a voice message including the verification code to the terminal device 1950. In other words, if the voice-response server 1940 determines that the terminal device 1950 is associated with the user who previously made the service request (at S190), the voice-response server 1940 sends the verification code to the terminal device 1950 via the voice message. Operations of S199 are similar to operations of S188 in the method 1800.

Figure 20:
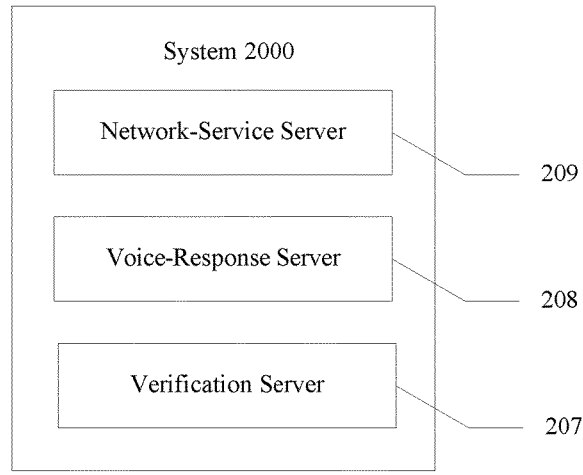
FIG. 20 is a schematic diagram illustrating components of a system configured to authenticate users for online services in accordance with some embodiments.

FIG. 20 is a schematic diagram illustrating components of a system 2000 configured to authenticate users for online services in accordance with some embodiments. The system 2000 can be structurally and functionally similar to the systems shown and/or described with respect to FIGS. 13-19. Particularly, server devices included in the system 2000 can be operatively coupled to and communicate with at least one terminal device associated with (e.g., owned by, operated by, registered under the name of, etc.) a user. The server device included in the system 2000 and the terminal device(s) are configured to collectively provide an online service to the user, and to perform user authentication for the user as described above with respect to FIGS. 14-19. As shown in FIG. 20, the system 2000 includes a network-service server 209, a voice-response server 208 and a verification server 207. In some embodiments, a system can include more or less devices than those shown in FIG. 20.

The network-service server 209, the voice-response server 208 and the verification server 207 can be structurally and functionally similar to the network-service server 135, the voice-response server 136 and the verification server 134 of the system 1300 in FIG. 13, respectively. Specifically, the network-service server 209 is configured to, among other functions, receive and process service requests, generate and send verification requests to the verification server 207, host and execute online service(s), interact with the terminal devices to provide online service(s) to users, and/or the like. The voice-response server 208 is configured to, among other functions, receive verification codes and identification information from the verification server 207, establish voice communications with the terminal devices, compare identification information, generate and send voice messages including verification codes to the terminal devices, and/or the like. The verification server 207 is configured to, among other functions, receive and process verification requests, send control instructions for presentation of verification methods to the terminal devices, receive selections of verification methods, generate and/or send non-voice messages including verification codes, detect failures in delivery of non-voice messages, generate and provide verification codes to the voice-response server 208, receive and verify verification codes authenticate users, and/or the like.

Figure 21:
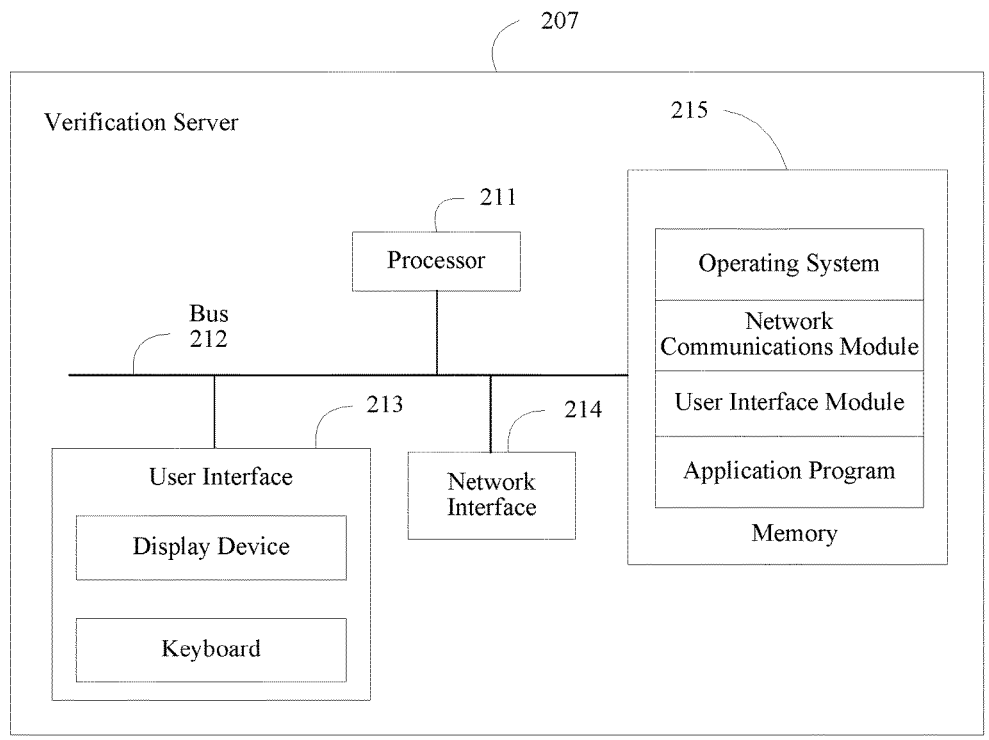
FIG. 21 is a schematic diagram illustrating components of a verification server in FIG. 20.

FIG. 21 is a schematic diagram illustrating components of the verification server 207 in FIG. 20. As shown in FIG. 21, the verification server 207 includes a processor 211, a bus 212, a user interface 213, a network interface 214, and a memory 215. In some embodiments, a verification server can include more or less devices, components and/or modules than those shown in FIG. 21.

The processor 211 can be any processing device capable of performing at least a portion (e.g., a server-side portion) of the methods 1400-1900 described with respect to FIGS. 13-19. Such a processor can be, for example, a CPU, a DSP, an ASIC, a FPGA, and/or the like. The processor 211 can be configured to control the operations of other components and/or modules of the verification server 207. For example, the processor 211 can be configured to control operations of the network interface 214 and the user interface 213. For another example, the processor 211 can be configured to execute instructions or code stored in a software program or module (e.g., a user authentication application) within the memory 215.

The bus 212 is configured to implement connections and communication among the other components of the verification server 207. The bus 212 can include, for example, a data bus, a communication bus, a power bus, a control bus, and/or the like. The user interface 213 is configured to interact with users operating the verification server 207 by using various input/output means. As shown in FIG. 21, the user interface 213 includes at least a display device (e.g., a screen, a monitor) and a keyboard. The display device is configured to display data and/or information in a visual form to users operating the verification server 207. The keyboard is configured to provide an input means to the users. In some embodiments, operations of the user interface 213 (e.g., the display device and the keyboard) are controlled by instructions or code stored in the user interface module within the memory 215.

The network interface 214 is configured to provide and control network interfaces of the verification server 207 that are used to interact with other network devices (e.g., terminal devices, the network-service server 209, the voice-response server 208). The network interface 214 can include, for example, a standard wired interface and/or a standard wireless interface (e.g., a Wi-Fi interface). In some embodiments, the network interface 214 is used for connecting one or more devices and performing data communication with the one or more devices. In such embodiments, as described above with respect to FIGS. 13-20, the network interface 214 is configured to receive, for example, verification requests, signals indicating selection of verification methods, detection signals, verification codes entered by users for user authentication, etc., from other devices (e.g., terminal devices, the network-service server 209, the voice-response server 208, etc.). The network interface 214 is also configured to transmit, for example, control instructions for presenting verification methods, verification codes, non-voice messages including verification codes, signals indicating successful user authentication, etc., to other devices (e.g., terminal devices, the network-service server 209, the voice-response server 208, etc.). In some embodiments, operations of the network interface 214 are controlled by instructions or code stored in the network communications module within the memory 215.

In some embodiments, the memory 215 can include, for example, a random-access memory (RAM) (e.g., a DRAM, a SRAM, a DDR RAM, etc.), a non-volatile memory such as one or more magnetic disk storage devices, optical disk storage devices, flash memory devices, or other non-volatile solid state storage devices. In some embodiments, the memory 215 can include one or more storage devices (e.g., a removable memory) remotely located from other components of the verification server 207.

As shown in FIG. 21, the memory 215 includes at least an operating system, a network communications module, a user interface module and an application program. In some embodiments, each component, program, application or module included in the memory 215 can be a hardware-based module (e.g., a DSP, an ASIC, a FPGA), a software-based module (e.g., a module of computer code executed at a processor, a set of processor-readable instructions executed at a processor), or a combination of hardware and software modules. Instructions or code of each component, program, application or module can be stored in the memory 215 and executed at the processor 211. Particularly, at least a portion (e.g., a server-side portion) of the instructions or code of the methods 1400-1900 shown and described above with respect to FIGS. 14-19 are stored in the application program within the memory 215. In some embodiments, the processor 211 is configured to perform the instructions or code stored in the application program within the memory 215, as shown and described above with respect to the methods 1400-1900 in FIGS. 14-19.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of user authentication, comprising:
at a server device having one or more processors and memory for storing programs to be executed by the one or more processors:
receiving, from a first terminal device associated with a user, a service request including identification information of the user for an online service;
generating a verification code in response to the service request and based on a user selection among a plurality of verification methods provided to the first terminal device;
identifying a second terminal device associated with the user according to the identification information of the user, wherein the second terminal device is distinct from the first terminal device;
sending a non-voice message to the second terminal device in a non-voice communication method based on the user selection, the non-voice message including the verification code;
in accordance with a determination of a failure of sending the non-voice message to the second terminal device in the non-voice communication method:
receiving a subsequent request including identification information of the user from the second terminal device for a voice communication with the server device;
determining whether the identification information of the user received from the second terminal device matches identification information of a registered user of the online service stored at the server device;
in accordance with a determination that the identification information of the user received from the second terminal device matches the stored identification information of the registered user:
establishing, based on the identification information of the user received from the second terminal device, the voice communication with the second terminal device associated with the user; and
sending, during the voice communication and to the second terminal device associated with the user, a voice message including the verification code such that the user uses the verification code to authenticate the service request at the first terminal device associated with the user.

2. The method of claim 1, wherein establishing the voice communication with the second terminal device associated with the user includes making a phone call to a phone of the user.

3. The method of claim 1, wherein establishing the voice communication with the second terminal device associated with the user includes receiving and responding to a phone call from a phone of the user.

4. The method of claim 1, further comprising, after receiving the service request and before establishing the voice communication:
sending a control instruction to the first terminal device associated with the user such that the first terminal device associated with the user presents the plurality of verification methods for the user to select; and
receiving, from the first terminal device associated with the user, a signal indicating a verification method selected by the user from the set of verification methods.

5. The method of claim 1, further comprising:
after sending the voice message:
receiving a verification code from the first terminal device associated with the user;
comparing the verification code received from the first terminal device associated with the user with the verification code sent to the second terminal device associated with the user; and
authenticating the service request at the first terminal device associated with the user in accordance with a determination that the verification code received from the first terminal device associated with the user is identical to the verification code sent to the second terminal device associated with the user.

6. The method of claim 1, wherein establishing the voice communication includes establishing the voice communication within a predefined period of time after receiving the subsequent request from the second terminal device.

7. A server device, comprising:
one or more processors; and
memory storing one or more programs to be executed by the one or more processors, the one or more programs comprising instructions for:
receiving, from a first terminal device associated with a user, a service request including identification information of the user for an online service;
generating a verification code in response to the service request and based on a user selection among a plurality of verification methods provided to the first terminal device;
identifying a second terminal device associated with the user according to the identification information of the user, wherein the second terminal device is distinct from the first terminal device;
sending a non-voice message to the second terminal device in a non-voice communication method based on the user selection, the non-voice message including the verification code;
in accordance with a determination of a failure of sending the non-voice message to the second terminal device in the non-voice communication method:
receiving a subsequent request including identification information of the user from the second terminal device for a voice communication with the server device;
determining whether the identification information of the user received from the second terminal device matches identification information of a registered user of the online service stored at the server device;
in accordance with a determination that the identification information of the user received from the second terminal device matches the stored identification information of the registered user:
establishing, based on the identification information of the user received from the second terminal device, the voice communication with the second terminal device associated with the user; and
sending, during the voice communication and to the second terminal device associated with the user, a voice message including the verification code such that the user uses the verification code to authenticate the service request at the first terminal device associated with the user.

8. The server device of claim 7, the one or more programs further comprising instructions for, after receiving the service request and before establishing the voice communication:
sending a control instruction to the first terminal device associated with the user such that the first terminal device associated with the user presents the plurality of verification methods for the user to select; and receiving, from the first terminal device associated with the user, a signal indicating a verification method selected by the user from the set of verification methods.

9. A non-transitory computer readable storage medium storing one or more programs, the one or more programs comprising instructions, which, when executed by one or more processors, cause the processors to perform operations comprising:
at a server device:
receiving, from a first terminal device associated with a user, a service request including identification information of the user for an online service;
generating a verification code in response to the service request and based on a user selection among a plurality of verification methods provided to the first terminal device;
identifying a second terminal device associated with the user according to the identification information of the user, wherein the second terminal device is distinct from the first terminal device;
sending a non-voice message to the second terminal device in a non-voice communication method based on the user selection, the non-voice message including the verification code;
in accordance with a determination of a failure of sending the non-voice message to the second terminal device in the non-voice communication method:
receiving a subsequent request including identification information of the user from the second terminal device for a voice communication with the server device;
determining whether the identification information of the user received from the second terminal device matches identification information of a registered user of the online service stored at the server device;
in accordance with a determination that the identification information of the user received from the second terminal device matches the stored identification information of the registered user:
establishing, based on the identification information of the user received from the second terminal device, the voice communication with the second terminal device associated with the user; and
sending, during the voice communication and to the second terminal device associated with the user, a voice message including the verification code such that the user uses the verification code to authenticate the service request at the first terminal device associated with the user.

10. The non-transitory computer readable storage medium of claim 9, the one or more programs further comprising instructions for, after sending the voice message:
receiving a verification code from the first terminal device associated with the user;
comparing the verification code received from the first terminal device associated with the user with the verification code sent to the second terminal device associated with the user; and
authenticating the service request at the first terminal device associated with the user in accordance with a determination that the verification code received from the first terminal device associated with the user is identical to the verification code sent to the second terminal device associated with the user.

11. The non-transitory computer readable storage medium of claim 9, wherein establishing the voice communication includes establishing the voice communication within a predefined period of time after receiving the subsequent request from the second terminal device.

* * * * *